(12) United States Patent
Kirchhoff et al.

(10) Patent No.: US 7,474,432 B1
(45) Date of Patent: Jan. 6, 2009

(54) METHODS AND SYSTEMS FOR FAX ROUTING

(75) Inventors: Leland Kirchhoff, Santa Barbara, CA (US); David Trandal, Santa Barbara, CA (US)

(73) Assignee: CallWave, Inc., Santa Barbara, CA (US)

( * ) Notice: Subject to any disclaimer, the term of this patent is extended or adjusted under 35 U.S.C. 154(b) by 149 days.

(21) Appl. No.: 11/684,799

(22) Filed: Mar. 12, 2007

Related U.S. Application Data

(63) Continuation-in-part of application No. 10/795,025, filed on Mar. 5, 2004.

(60) Provisional application No. 60/781,887, filed on Mar. 13, 2006.

(51) Int. Cl.
  *G06F 3/12* (2006.01)
  *H04M 1/64* (2006.01)

(52) U.S. Cl. .................. 358/1.15; 358/440; 358/442; 358/407; 379/100.09; 379/142.05; 379/88.19

(58) Field of Classification Search ............... 358/1.15, 358/440, 442, 402, 407; 379/100.08, 100.09, 379/100.12, 210.02, 88.2, 211.02, 142.05, 379/268, 265.09, 88.19, 88.21, 207.02, 133
See application file for complete search history.

(56) References Cited

U.S. PATENT DOCUMENTS

| | | | |
|---|---|---|---|
| 3,936,613 A | 2/1976 | Nishigori et al. | |
| 3,956,595 A | 5/1976 | Sobanski | |
| 4,009,337 A | 2/1977 | Sakai et al. | |
| 4,022,983 A | 5/1977 | Braun et al. | |
| 4,485,470 A | 11/1984 | Reali | |
| 4,736,405 A | 4/1988 | Akiyama | |
| 4,809,321 A | 2/1989 | Morganstein et al. | |

(Continued)

FOREIGN PATENT DOCUMENTS

CA    1329852    9/1989

(Continued)

OTHER PUBLICATIONS

Johnson, Dave; Article; "Now You're Talking—voice—response systems for home offices—Product Information"; http://www.findarticles.com; Feb. 1999.

(Continued)

*Primary Examiner*—Kimberly A Williams
(74) *Attorney, Agent, or Firm*—Knobbe, Martens, Olson & Bear LLP

(57) ABSTRACT

In an illustrative embodiment, methods and systems are provided for processing facsimiles. A call processing system receives a first message transmitted from a first carrier system regarding a facsimile call to a phone address. The first message includes an identifier associated with the user. The identifier is used to determine if the user is authorized to receive call processing system services. If the user is authorized, a second message is transmitted to the first carrier system, the second message indicating that the first carrier system is to connect the call to the call processing system. The call processing system is connected to the call. A facsimile is received via the call at the call processing system. Information regarding the facsimile call is provided over a network, wherein some or all of the information is displayed in a call log visually accessible by the user.

60 Claims, 11 Drawing Sheets

U.S. PATENT DOCUMENTS

| | | |
|---|---|---|
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,404,537 A | 4/1995 | Olnowich et al. |
| 5,434,908 A | 7/1995 | Klein |
| 5,459,584 A | 10/1995 | Gordon et al. |
| 5,467,388 A | 11/1995 | Redd, Jr. et al. |
| 5,526,524 A | 6/1996 | Madduri |
| 5,533,102 A | 7/1996 | Robinson et al. |
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,751,795 A | 5/1998 | Hassler et al. |
| 5,761,312 A | 6/1998 | Zelikovitz et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,894,504 A | 4/1999 | Alfred et al. |
| 5,946,386 A * | 8/1999 | Rogers et al. .......... 379/265.09 |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich |
| 6,078,581 A | 6/2000 | Shtivelman et al. |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,304,565 B1 | 10/2001 | Ramamurthy |
| 6,310,939 B1 | 10/2001 | Varney |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,405,035 B1 | 6/2002 | Singh |
| 6,411,601 B1 | 6/2002 | Shaffer et al. |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,483,600 B1 | 11/2002 | Schuster et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,539,084 B1 | 3/2003 | Long |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,594,351 B1 | 7/2003 | Bhogal et al. |
| 6,621,892 B1 | 9/2003 | Banister et al. |
| 6,643,034 B1 | 11/2003 | Gordon et al. |
| 6,662,232 B1 | 12/2003 | Nicholls et al. |
| 6,690,785 B1 | 2/2004 | Stelter et al. |
| 6,751,299 B1 | 6/2004 | Brown et al. |
| 6,775,370 B2 | 8/2004 | Burg |
| 6,782,088 B1 | 8/2004 | Gabara |
| 6,785,021 B1 | 8/2004 | Gordon et al. |
| 6,792,094 B1 | 9/2004 | Kirkpatrick |
| 6,798,870 B1 | 9/2004 | Lines et al. |
| 6,801,932 B1 | 10/2004 | Picoult et al. |
| 6,857,074 B2 | 2/2005 | Bobo, II |
| 6,898,275 B2 | 5/2005 | Dolan et al. |
| 6,928,479 B1 | 8/2005 | Meyer et al. |
| 6,968,174 B1 | 11/2005 | Trandal et al. |
| 7,003,087 B2 | 2/2006 | Spencer et al. |
| 7,230,745 B1 | 6/2007 | Street, Jr. |
| 7,283,270 B2 | 10/2007 | Boire-Lavigne et al. |
| 2002/0010616 A1 | 1/2002 | Itzhaki |
| 2002/0041391 A1 | 4/2002 | Bannai |
| 2002/0097710 A1 | 7/2002 | Burg |
| 2003/0039339 A1 | 2/2003 | Luehrig et al. |
| 2003/0048484 A1 | 3/2003 | Seki et al. |
| 2003/0072432 A1 | 4/2003 | Kelly |
| 2003/0156700 A1 | 8/2003 | Brown et al. |
| 2003/0215078 A1 | 11/2003 | Brahm et al. |
| 2004/0001221 A1 | 1/2004 | McCallum |
| 2004/0028203 A1 | 2/2004 | Wurster et al. |
| 2004/0125924 A1 * | 7/2004 | McMullin et al. ........ 379/88.19 |
| 2004/0146153 A1 | 7/2004 | Solin |
| 2004/0184096 A1 | 9/2004 | Choi |
| 2004/0190706 A1 | 9/2004 | Fleisher, III et al. |
| 2004/0258220 A1 | 12/2004 | Levine et al. |
| 2005/0041643 A1 | 2/2005 | Noguchi et al. |
| 2005/0053216 A1 | 3/2005 | Spencer et al. |
| 2005/0123118 A1 | 6/2005 | Terry et al. |
| 2005/0154599 A1 | 7/2005 | Kopra et al. |
| 2005/0207556 A1 | 9/2005 | Gonzalez et al. |
| 2006/0013374 A1 | 1/2006 | Fleisher, III et al. |
| 2006/0268007 A1 | 11/2006 | Gopalakrishnan |
| 2006/0268831 A1 | 11/2006 | Ulybin |
| 2007/0002077 A1 | 1/2007 | Gopalakrishnan |
| 2007/0013960 A9 | 1/2007 | Gordon et al. |
| 2007/0067738 A1 | 3/2007 | Flynt et al. |
| 2007/0116213 A1 | 5/2007 | Gruchala et al. |
| 2007/0202898 A1 | 8/2007 | Bae et al. |
| 2007/0223053 A1 | 9/2007 | Jin |
| 2007/0223056 A1 | 9/2007 | Arimoto |
| 2007/0229910 A1 | 10/2007 | Ulybin |
| 2008/0075250 A1 * | 3/2008 | Kent et al. .................. 379/133 |

FOREIGN PATENT DOCUMENTS

| | | |
|---|---|---|
| EP | 1120954 | 8/2001 |
| WO | WO 00 60840 | 10/2000 |
| WO | WO 01/76210 | 10/2001 |

OTHER PUBLICATIONS

Article: "Widget MySpace Widget"; posted by 4INFO Bob; http://4info.typepad.com/blog/2006/09/widget_myspace_.html; Sep. 15, 2006; 3 pages.

Article: Communications-SMS, Dashboard Widgets—Showcase; http://www.dashboardwidgets.com/showcase/details.php?wid=1082; Oct. 14, 2005; 2 pages.

* cited by examiner

FROM: Fax from 805-690-4000, Santa Barbara [faxwave_service@callwave.com]

TO:

CC:

SUBJECT: 1 Page Fax Received From CA, CallWave

Thank you for using you Fax number, 775-511-1000

Your 1 page Fax was received on Tuesday, Mar 7, 2006 at 2:16PM

From: 805-690-4000   Santa Barbara CA CallWave
To view your fax, please click on or download the attached file.

(If you have problems viewing this fax please visit http://www.callwave.com/p4711.asp)

To learn more about CallWave Fax Lines visit our website at http://www.callwave.com

FIG. 4

METHODS AND SYSTEMS FOR FAX ROUTING

CROSS-REFERENCE TO RELATED APPLICATIONS

The present application is a continuation-in-part of U.S. patent application Ser. No. 10/795,025, filed Mar. 5, 2004, and claims priority from U.S. Patent Application No. 60/781,887, filed Mar. 13, 2006, the contents of which are incorporated herein in their entirety.

STATEMENT REGARDING FEDERALLY SPONSORED R&D

Not applicable

PARTIES OF JOINT RESEARCH AGREEMENT

Not applicable

REFERENCE TO SEQUENCE LISTING, TABLE, OR COMPUTER PROGRAM LISTING

Not applicable

FIELD OF THE INVENTION

The present invention relates generally to telecommunications systems and in particular, to methods and systems that can be used with respect to facsimile routing and handling.

DESCRIPTION OF THE RELATED ART

The electronic transmission of documents by way of fax systems continues to be commonplace and, often, an essential component of many business activities. With the emergence of electronic mail in the business environment, many predicted the demise of fax. This has not been the case.

However, there continue to be shortcomings among the fax systems currently in use in the business and consumer markets. In the business setting, fax machines may be busy or out of paper, preventing the receipt of incoming faxes. Furthermore, with many conventional systems, there generally is no real-time notification to a recipient that a fax has been sent to the recipient. That is, a fax recipient often is not aware that a fax exists until it is hand delivered or picked up at the fax machine. If the recipient is expecting a fax, it is inconvenient for him to constantly check whether the fax has arrived if the fax machine is located far away from the recipient. Fax machines may also be shared by many users and, as a result, the sender of the fax often will feel obligated to take the additional step of drafting a cover page to identify the recipient of the fax. In some cases, faxed documents are of such a sensitive nature that the sender would like to have some control over who might see those documents as they move from the receiving fax machine to the actual recipient. In the consumer setting, individuals may not have access to a dedicated or shared fax machine and/or a dedicated fax line. This can make it difficult or impossible to receive faxes. These circumstances result in a number of practical problems for fax users.

In recent years, Fax-to-Email services such as that provided by CallWave, Inc., have been introduced to address these problems for users with access to the Internet. Typically, a user is assigned a telephone number and calls are routed via methods such as call forwarding or direct call termination on a softswitch capable of converting the call to a fax session. Once the fax is received, it is routed to a user's email address or a client application running on a network computer associated with a user.

SUMMARY

Example embodiments of methods and systems are described herein that provide fax routing services.

An example embodiment provides a method of processing facsimiles, the method comprising: receiving at a call processing system a first message transmitted from a first carrier system at least partly in response to the first carrier system receiving a call from a caller directed to a user phone address, the first message including a phone address associated with the caller and an identifier associated with the user; using information in the first message to determine if the user is a subscriber of a first service offered by the call processing system; if the user is a subscriber of the first service offered by the call processing system: receiving a facsimile via the call at the call processing system; logging the call in a first call processing system call log; determining if a user telecommunications client is online, and if the telecommunications client is online, enabling the client and call log to synchronize with at least a portion of the first call processing system so that the call is included in a call log displayed via the client application.

An example embodiment provides a method of processing facsimiles, the method comprising: receiving at a call processing system a first message transmitted from a first carrier system regarding a call to a phone address associated with a user while the call is in progress, the first message including an identifier associated with the user, wherein the call is a facsimile call; using the identifier to determine if the user is authorized to receive services offered by the call processing system; at least partly in response to determining that the user is authorized: transmitting a second message to the first carrier system, the second message indicating that the first carrier system is to connect the call to the call processing system; connecting to the call at the call processing system; receiving a facsimile via the call at the call processing system; and providing over a network information regarding the facsimile call, wherein some or all of the information is displayed in a call log visually accessible by the user.

An example embodiment provides a method of processing facsimiles, wherein a first telecommunications system monitors a condition for a user phone address, the method comprising: receiving at a second telecommunication system an indication from the first telecommunication system that the condition has been satisfied, wherein the condition is at least partly satisfied by a first call directed to the user phone address being received at the first telecommunications system; receiving at the second telecommunication system the caller phone address and information related to the user; connecting to the first call at the second telecommunications system; determining if the first call is a facsimile call; if the first call is a facsimile call, receiving a facsimile via the call at the second telecommunication system; and providing over a network information regarding the facsimile call, wherein some or all of the information is displayed in a call log visually accessible by the user.

BRIEF DESCRIPTION OF THE DRAWINGS

Embodiments of the present invention will now be described with reference to the drawings summarized below.

These drawings and the associated description are provided to illustrate example embodiments of the invention, and not to limit the scope of the invention.

FIG. 4 illustrates a sample email notification with an attached fax.

DETAILED DESCRIPTION OF PREFERRED EMBODIMENTS

Figure 1:
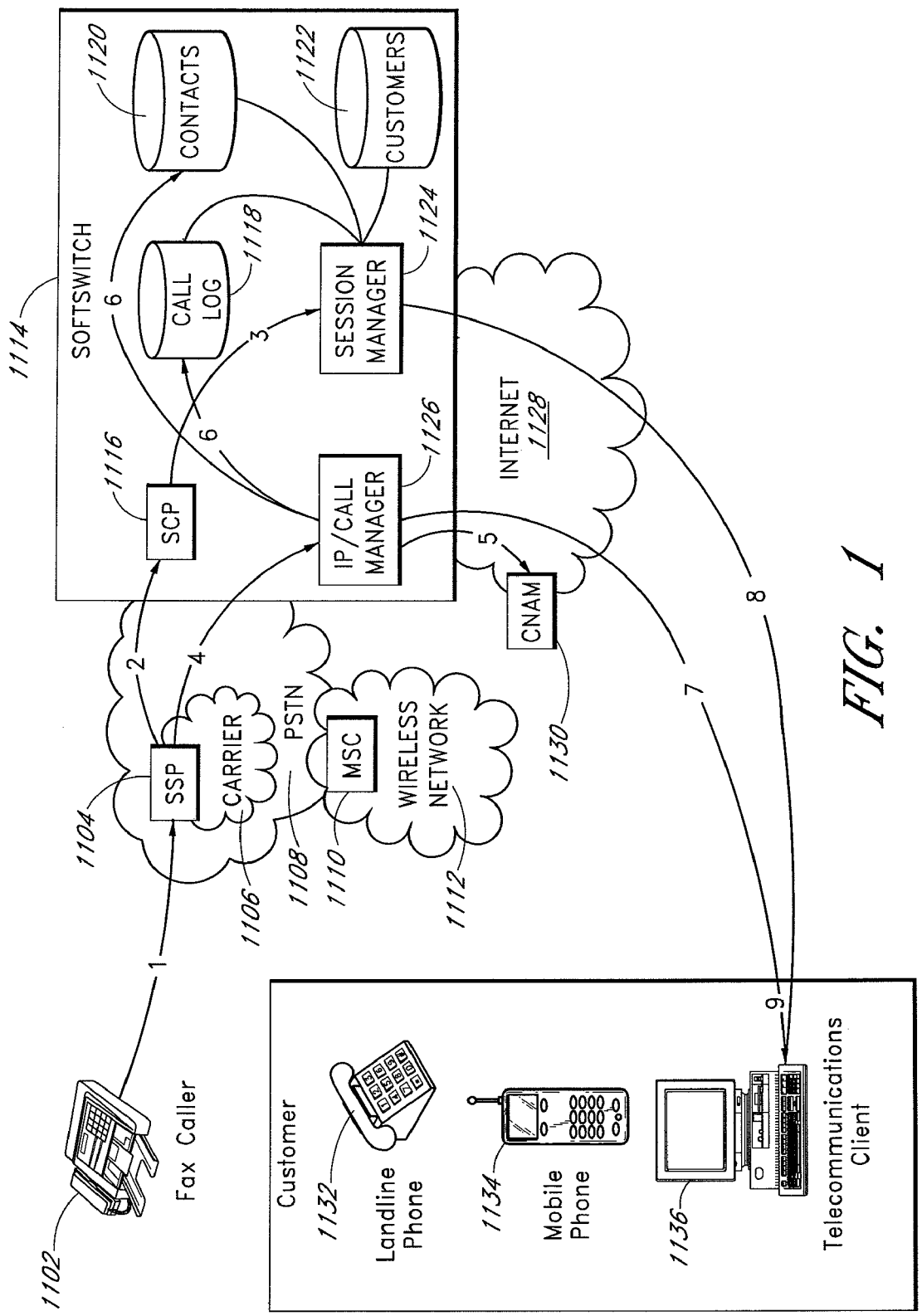
FIG. 1 illustrates an example operating environment and example call processing.

Example embodiments of methods and systems are described herein that provide fax routing services. Certain embodiments use triggers, such as the SS7 Advanced Intelligent Network (AIN) triggers or Wireless Intelligent Network (WIN) triggers, in providing such fax routing services.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

Further, while the following description refers to example network and telephony standards and protocols, other standards and protocols can be used as well. In addition, while references may be made to electronic address books or contact lists, other data stores and formats can be used to store contact information. While certain intelligent network triggers are referred to herein, other triggers (e.g., condition monitors/detectors) or events can be used as well. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order.

Similarly, while certain examples may refer to a personal computer system or data device, other computer or electronic systems can be used as well, such as, without limitation, an interactive television, a networked-enabled personal digital assistant (PDA), a networked game console, a networked entertainment/multimedia playback device, and so on. While certain references are made to certain example system components or services, other components and services can be used as well. In addition, while certain user inputs may be described as being provided via phone key presses or by clicking on a button, optionally, user inputs can be provides using other techniques, such as by voice or otherwise. While certain phone numbers are referenced for purposes of illustration, other phone numbers or electronic addresses or locators can be used as well.

Unless otherwise specified, the term phone number refers generally to a telephonic address, such as, without limitation, a standard POTs telephone number, an E.164 phone number (ITU-T recommendation which defines the international public telecommunication numbering plan and telephone format used in the PSTN and certain data networks), or a VoIP address.

In an example embodiment, enhanced call management services are provided via Common Channel Signaling (CCS) or Common Channel Interoffice Signaling (CCIS) information, such, by way of example, as via SS7 Intelligent Network (IN) triggers in the switches of local exchange telephone companies. For example, SS7 AIN triggers are set in the switches of Carrier Partners (e.g., carriers who are partners with a third party call processing operator in providing enhanced call processing services) to route inbound faxes.

In an example embodiment, when the Carrier Partner (CP) configures a trigger at the appropriate point in an inbound fax call for a user (e.g., a subscriber or customer), a call processing system (also referred to as a softswitch or fax processing system), such as that associated with the third party call processing operator, acting as a Service Control Point (SCP) in the SS7 network, receives a query. This enables the call processing system to instruct the switch how to route the call to the call processing system, receive the fax, convert it to a certain format (e.g., a common format such as the PDF, TIFF, PCL, HPGL, CSF, or other format) and deliver the fax (e.g., in the converted format) to the customer via email, via a Web site, and/or via a telecommunications client hosted by a computer associated with the customer, optionally along with the customer's voice calls, voice mail messages, SMS messages, MMS messages, and/or other communications. optionally, this process can address some or all of the drawbacks of certain conventional techniques identified above while optionally reducing a provider's line costs. The process also may reduce fax line chum to other Internet-based fax services.

The functionality, operation, and implementation for an example fax routing service will now be described in greater detail.

GLOSSARY

AIN—Advanced Intelligent Network
CP—Carrier Partner
IP—Intelligent Peripheral
MMS—Multimedia Messaging Service
MSC—Mobile Switching Center
PDF—Portable Document Format
POP—Post Office Protocol
SCP—Service Control Point
SOHO—Small Office/Home Office
SMS—Short Message Service
SS7—Signaling System 7
SSP—Service Switching Point
TCAP—Transaction Capabilities Application Protocol
TIFF—Tagged Image File Format XIF—XML Interface Format
XML—Extensible Markup Language System and Operation Description FIG. 1 illustrates an example system and network components involved in providing an example fax routing service using AIN triggers for an inbound call.

A phone company configures triggers at the appropriate points in the inbound calls for a subscriber/customer at an exchange, such as a local exchange. An enhanced service provider, associated with a softswitch and a system acting as a Service Control Point (SCP) in the SS7 network, receives queries from a local exchange (e.g., via a Service Switching Point (SSP)) that enables it to collect information about the call and/or instruct the switch how to handle the call. Optionally, the owner/operator of the softswitch enters into a contractual or other arrangement with the carrier associated with the SSP to set triggers on some or all of lines associated with the SSP. In another example, a phone company purchases, leases develops, or otherwise controls a softswitch (or other call processing system) acting as an SCP in the SS7 network. The present operating environments are described by way of example, and other operating environments may be used as well.

In an example embodiment, the SS7 Wireless Intelligent Network (WIN) triggers are set in the mobile switches of Wireless Carrier Partners to provide similar calling services but for a mobile account.

In another example embodiment, the softswitch contains one or more systems referred to as call managers. The call managers are connected to the PSTN via ISDN using the ISUP (ISDN User Part) protocol, by way of example, although other protocols can be used. The call managers provide some or all of the following: a call screening service when screening is enabled, record a message from a caller, provide a voice prompt or message that is to be played to a caller and/or called party, record a facsimile document, detect speech or DTMF tones, convert speech that needs to be converted to text, and/or provide a gateway between the SS7-based networks (PSTN) and SIP-based networks (VoIP). The example call manager optionally can also act as an IP (Intelligent Peripheral), another AIN component that the SCP can instruct the SSP to connect into the call for interaction with the called and calling party. The IP/call managers and SCPs in the softswitch optionally share a Call Registry that stores information about active calls.

Softswitch session manager(s) optionally track telecommunication client presence and interact with a given telecommunications client (e.g., a client application hosted on a personal computer, PDA, smart phone, or a networked television) as call log, contact, and/or customer data needs to be synchronized with the centralized databases to provide the customer, via the client, with updated log, contact, and/or customer data. One or more session managers also optionally provide the SCP in an AIN environment and call manager in a non-AIN environment with service configuration information for the customer involved in a call. During an active call, the SCP and/or IP/call manager optionally directly or indirectly interact with the telecommunications client to provide call progress information, and to stream audio and/or visual content.

The softswitch in this example contains centralized databases and/or a general-purpose storage area, optionally including, but not limited to, some or all of the following: a call log database, a contacts database, and a customer database. Optionally, the databases are not centralized and may be distributed geographically and/or over different systems. The call log database stores call events and related data for incoming and/or outgoing calls and text and/or multimedia messages. Optionally, a fax call is logged in the customer's account regardless of whether a fax was actually received. Optionally, a fax call is not logged in the customer's account unless at least a portion of the fax was successfully received. The contacts database stores information and parameters (e.g., names, identifiers, and/or phone numbers/addresses, birthdays, notes, automated characters, etc.) associated with a sender, called, or calling party. The customer database stores information and parameters (e.g., account data and configuration information) associated with subscribers/customers/users. The softswitch optionally includes a name cache.

The softswitch call processing system optionally includes other subsystems, such as some or all of the following: a router subsystem, which serves as an interface to the Internet to manage communications between online IP client devices and call processing servers, a web server subsystem to manage a "web site" associated with the softswitch (e.g., via which a user can access an account set-up/configuration user interface, a call log, a contacts database, etc., using a browser or other network user interface), etc. These subsystems are optionally interconnected via a Local Area Network (LAN), a Wide Area Private Network (WAN), and/or a Wide Area Public Network (e.g., Internet).

By way of background, a trigger has an associated firing criterion. When a trigger is made active (armed), and its associated firing criteria is (are) satisfied, the trigger fires. When a trigger fires, in an example embodiment, a message is formatted with call related data and the message is transmitted. For example, the message may be transmitted by the SSP to the SCP. The SCP (or other destination) then reads and/or stores in computer readable memory some or all of this call related data and generates a response which the SSP (or other source or system) then uses in further call processing.

A customer can have a fax routing service described herein enabled on a new or existing phone number (e.g., a number serviced by a Carrier Partner). The service may optionally be configured in the softswitch as a separate, new account, or the fax routing service for the phone number may be added to an existing account already servicing a voice phone line. If a separate account is created for fax calls, logged fax calls are optionally not intermixed with logged voice calls. If a new account is being created for fax calls, the customer can optionally request that the new account be configured as a sub-account of an existing customer account. When a call to a phone number configured with a fax routing service is received, the call is answered by the softswitch and the fax is received via the standard Group 3 or 4 fax protocols, by way of example, or via other fax protocols.

An account can be optionally configured to have a shared voice/fax phone number. In this case, when a call is received on the shared phone number the call is answered by the softswitch, which determines if the call is a fax call by determining whether a fax tone is present. If the softswitch detects a fax tone within a certain time period (e.g., a configurable time window), the softswitch provides the corresponding handshaking with the transmitting fax device (e.g., a dedicated fax machine or fax server (e.g., a computer with fax transmission software) plugged into a telephone jack, routed through a PBX, connected to the PSTN via a LAN and a gateway between the LAN and the telephone network) and the fax is received.

If a fax tone is not detected within the configurable interval (e.g., for example, a default period of two seconds), the caller is presented with a ring back tone (e.g., as would be presented to a caller calling a voice-only line) and the system attempts to deliver the voice call to the phone(s) configured by the softswitch operator or by the customer (e.g., the customer's work, home, VoIP, and/or mobile phone). Optionally, with a shared voice/fax phone number, callers making voice calls may be charged for the call even though they think the call did not complete.

As discussed above, optionally, the customer may configure the format in which faxes are to be stored and transmitted via an account set-up interface, which is stored in the customer database. By way of example, the account set-up interface can be a web presentation (e.g., accessed via a web site associated with the enhanced call service provider) or a client application. The format choices include but are not limited to:

Portable Device Format (PDF)
    XML Interface Format (XIF)
    Tagged Image File Format (TIFF)
    Printer Command Protocol (PCL)

Optionally, as soon as a fax message is received, it is automatically converted to the configured format. Alternatively, a fax message remains in the format it is received and converted to the configured format when sent to the customer's computer or after being received by the customer's computer (or other terminal). Optionally, the system retains a copy in the received format and in the converted format.

As discussed below, when a fax is received, in an example embodiment, call signaling information (e.g., the caller ID) is used to attempt to determine the caller's name/identity. An example sequence in which the caller name databases are queried includes some or all of the follow, although other external databases can be searched or queried such as standard web databases):

Customer contact list (e.g., an electronic address book)
    A name cache in softswitch
    An external CNAM database
    A Line Information Database (LIDB)

If a name is found in the external database the name is added to the cache. The cache is optionally purged nightly (or at other designated times or periods) of entries that are older than a configurable time interval.

Optionally, a contact is automatically created in the customer's contact list (e.g., an electronic address book or other data store) when a fax call is received from a new fax sender for which the customer does not already have a contact record. The sender's phone number and caller name (if known and other information about the caller) are stored in the contact on the softswitch and/or on the telecommunications client, or other personal information manager (e.g., Microsoft Outlook). The customer can use the telecommunications client, web interface, or other personal information manager to edit this contact information or to create new contacts.

The fax can be routed in accordance with one or more rules defined by the customer. Optionally, the customer can modify one or more rules via a user interface (e.g., a Web page presented via a browser, or an interface presented by a dedicated telecommunications client). A customer may have multiple fax numbers, which can be used for different purposes. For example, the customer may have a personal fax number for personal faxes, a business fax number for business faxes, etc. The customer can specify that all of the faxes received at the different fax numbers are to be displayed and accessed via a common call log and/or that each fax number is to have a dedicated call log. By way of further example, optionally the customer can configure different notification-types for faxes received at different fax numbers. By way of illustration, optionally the customer can specify that SMS fax notifications are to be sent for faxes directed to the business fax number, but not for faxes sent to the personal fax number. Optionally, the customer can specify different fax formats for faxes received at different fax numbers.

FIG. 1 depicts an example illustrative scenario in which a fax caller dials the customer's fax phone number/address and the call, per the customer's configuration, routes to the softswitch via an AIN trigger. As will be described in greater detail below, in this example, a carrier (e.g., a CP) identifies which of its customers are to have fax routing enabled and for those that have fax routing enabled, the carrier identifies a point code of the SSP serving the corresponding customer landlines. The carrier sets an AIN trigger (e.g., Terminating Attempt trigger) for inbound calls for the serviced landline telecommunication devices (e.g., phones and/or fax devices) and directs the associated TCAP queries to the point code of the softswitch SCP.

A telecommunications client application (e.g., a CallWave personal computer client, or a client hosted on an interactive television, a networked personal digital assistant, a smart phone, or other processor-based device, etc.) and/or a Web-based user interface are used to provide communication services. Optionally, a customer can have multiple clients hosted on multiple computers. In an example embodiment, the telecommunications client application connects to and communicates with the softswitch via the Internet, an intranet, or other network. The client application, executing on a subscriber's computer terminal, can make the subscriber's online presence known to the softswitch (e.g., by transmitting a message over the Internet to the softswitch).

The client can be used to receive and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call (e.g., voice, fax, SMS message, MMS message, etc.), and call alert data (e.g., for an active call, listing the caller phone number, name/textual identifier (or graphical/pictorial identifier, such as an icon or photograph), city/state, and/or call status (e.g., ringing, playing greeting, recording caller message, terminating call, displaying fax)). Optionally, the call alert also plays an audible signal, such as a ring tone, via the host speakers.

The client application can display a log of recorded messages from callers, and can provide playback controls (e.g., play, fast forward, rewind) for playing back or displaying the recorded message (e.g., a voice message, a video message, a fax message, etc.) via the client computer terminal. The client optionally can also be used to screen calls (e.g., wherein the softswitch streams a message being left by a caller to the client so that the called party can listen to the message in substantially real time and the caller cannot hear the called party) and to instruct the softswitch to accept calls on the host computer terminal, forward calls, refuse calls, initiate call conferencing, and to otherwise provide call handling instructions.

For example, when a call alert is received by the client, as part of call presentation, a ringing sound is optionally played via the client host. Optionally, the incoming call is displayed in a call alert user interface for a first amount of time (e.g., a set time, such as 5 seconds, or for a user configurable period of time), and then the call appears in the associated call log.

With reference to FIG. 1, an example call handling sequence is as follows:

State 1. A caller 1102 dials the customer's fax phone number/address. By way of example, the fax phone number/address can be associated with a landline coupled to a facsimile device located local to the customer (e.g., at the customer work or home) or elsewhere. The call is routed through the PSTN 1108 to the carrier 1106 (e.g., CP) switch 1104 (e.g., a Service Switching Point (SSP)), serving that customer.

State 2. A trigger (e.g., a Termination_Attempt trigger), armed in the SSP 1104 for the customer's fax phone number/address (or for all or a specified subset of phone numbers/addresses), fires causing a query (e.g., a Transaction Capabilities Application Part (TCAP) query) to the configured SCP point code, which, in this example, is assigned to the softswitch 1114. The TCAP query includes call signaling information, including, for example, the caller phone number/address and/or an identifier associated with the called party (e.g., the called party phone number and/or an account number (e.g., which includes numbers and/or letters) associated with the called party).

State 3. The softswitch 1114 verifies the called party identifier (e.g., phone number/address) is that of a customer (e.g., a subscriber of a service offered by the operator of the softswitch 1114 and/or other entity having an account associated with the softswitch 1114), optionally by determining if the identifier (e.g., the called phone number/address) matches a customer identifier (e.g., a phone number/address) in the Customer database 1122 (which stores customer account records). The softswitch SCP 1116 queries the softswitch session manager 1124 or other databases to obtain the inbound call-processing configuration for this customer. In this example, the SCP 1116 determines this call relates to a fax, and so fax service is needed. For example, the caller phone number can be identified either within the SSP 1104 or via another database as a fax number or a "fax" capable line. The SCP 1116 then responds to the SSP 1104 with a message, such as, for example, Forward_Call, to route the call to the softswitch call manager 1126 (or other designated destination via which fax service can be provided). The SCP 1116 updates a call registry in the softswitch 1114 for sharing the call with the call manager 1126.

State 4. In response to the SCP message (e.g., Forward_Call), the SSP 1104 directs the call to the call manager 1126. The call manager 1126 retrieves the call state from the call registry and determines that a fax is to be received. The call manager 1126 allocates resources for this purpose and receives the fax. The fax, as received, is optionally retained in the softswitch 1114 in computer readable memory. The call manager 1126 optionally also converts the fax into another format (e.g., a format chosen by the customer or by the softswitch operator). In this example, the fax is converted into a PDF (Portable Document Format) file. Optionally, the customer can configure the format and how s/he prefers to receive fax documents (e.g., via e-mail, via a Web site, via an MMS message, etc.) using an account set-up user interface, which will then be stored in the Customer database 1122. Optionally, the format is a default format designated by the softswitch operator that can be changed by the customer.

In this example, the fax caller had not called the customer previously. The call manager 1126 attempts to determine the identity (e.g., the name) of the caller. The call manager 1126, for example, can use the caller ID signaling data associated with the call to attempt to locate a record associated with the caller. The call manager 1126 queries the softswitch's name cache (e.g., using some or all of the caller ID signaling data), but, in this example, the name cache does not include a record matching the caller ID data. The call manager 1126 therefore queries an additional database to get the caller's name and stores the name (if located) in association with the call. For example, the additional database can be an external CNAM (Calling Name) database 1130 and/or Line Information Database (LIDB) to access the caller's name and optionally phone type (home, work, mobile cell, etc).

Optionally, the query is not limited to CNAM or LIDB type information. For example, a more extensive search of third party databases and/or information accessible via searches over the Internet 1128 is optionally performed, and some or all of the following information can potentially be obtained: the caller's (or other contact's) home Web page (e.g., a uniform resource locator (URL) associated with the Web page), email address, physical address, SMS address, MMS address, instant messaging (IM) name/address, photos, favorite songs, preferred music type, etc. Optionally, even if the caller is associated with a record, the system can automatically attempt to verify and/or supplement the contact record (e.g., populate one or more empty contact record fields) via information obtained from CNAM, LIDB, and/or other data stores.

Optionally, the softswitch 1114 accesses one or more call blocking databases that stores phone numbers and/or names from which the customer does not want to receive faxes and/or other calls. The call blocking databases may include a telemarketer database maintained by the softswitch operator, the carrier or a government entity. In addition or instead, the call blocking databases may include phone numbers and/or other identifiers provided by the customer (e.g., via a call blocking user interface). If the fax is from an entity identified in the call blocking database(s), the fax is automatically blocked (e.g., fax handshaking is not provided which would result in the fax being transmitted to the softswitch 1114, or the softswitch receives the fax but does not forward it to the customer).

State 5. The call manager 1126 logs the call with the associated fax message and updates the call frequency information for the corresponding contact (e.g., the caller). For example, the call manager 1126 can track the number of calls received from the contact (optionally, the total number of calls from a certain date or in a specified time period, and/or the number of calls from each phone number associated with the contact).

State 6. In this example, the customer has requested (or the customer's account has otherwise been configured) that fax notifications (and optionally, other call notifications) be sent to an email address provided by the customer. Since the customer has email notification configured, the call manager 1126 sends an email to the customer with the fax attached in the specified format (e.g., PDF) or otherwise embedded in the email. The email notification optionally includes the phone number and name (or other textual or graphical/pictorial identifier, such as an icon or photograph) of the caller, if available. The email can be received and accessed via an email client or via a Webmail/POP system using, for example, an email client or Web browser hosted by a client computer system, mobile phone 1134, networked interactive television, or other appropriately configured terminal. Optionally, the customer can configure their account so that fax notifications are transmitted to the customer's mobile cell phone or other wireless device over a wireless network 1112 via a gateway MSC 1110 (e.g., via an SMS or MMS message to a corresponding address, such as the mobile phone number). The notification transmitted to the customer's mobile phone can include the name (and/or other identifier) and phone number (and optionally other information) of the fax sender if available. A voice notification can likewise be transmitted by the system to the mobile phone 1134 or a landline phone 1132.

State 7. The session manager 1124 identifies that a new call has been logged for the customer. The session manager 1124 determines if the customer's telecommunications client is online (e.g., by communicating with the client over the Internet 1128). In this example, the client is online. The session manager 1124 notifies the client (e.g., via a message transmitted over the Internet) to synchronize with the softswitch call log database 1118 to receive the logged fax call. Optionally, if the client had been offline, the client would have received the fax the next time it went online.

State 8. The fax call is displayed in the client call log (e.g., via the customer communications client 1136), optionally with an indication of the number of pages in the fax and/or the size of the fax file (e.g., in kilobytes or megabytes). The customer clicks the play button to view the fax via the client 1136 or appropriate document viewer hosted on a customer terminal (e.g., a personal computer, a smart phone, etc.). In this example, the fax is also received as part of an email message via an email client hosted on the customer computer or other terminal.

In an alternative embodiment, if the customer's client is online, the session manager 1124 (or other component of the softswitch 1114) notifies the telecommunications client 1136 on the SCP's behalf that there is an incoming call. The telecommunications client displays the call in its active call window (e.g., a call alert user interface) with the status set to "ringing". As the call manager 1126 begins receiving the fax, optionally each fax page can be streamed to the telecommunications client in substantially real time and, optionally, automatically displayed on the customer's computer (e.g., via the client application or other appropriate viewer) as the pages are received. For example, the fax can optionally be streamed using methods and systems described herein and/or as described in copending U.S. patent application Ser. No. 11/120,163, entitled "METHODS AND SYSTEMS FOR TRANSFERRING VOICE MESSAGES AND FAXES OVER A NETWORK", incorporated herein in its entirety by reference.

An optional embodiment that provides substantially the same service from a user perspective utilizes Intelligent Peripheral (IP) functionality provided in the softswitch 1114. for example, the IP may be coupled to receive communications from the SSP 1104. An IP can be used to provide resources such as fax services, custom voice announcements, voice recognition, interactive voice response, and/or dual-tone multifrequencies (DTMF) digit collection. The IP optionally includes a switching matrix to provide these resources to a requester or user. In an example embodiment, the SCP 1116 uses an instruction (e.g., Send_to_Resource) to route the call to the IP for fax service.

As similarly discussed above, if the customer has a telecommunications client application, correspondingly installed on one or more terminals (e.g., personal computers, smart phones, interactive televisions, etc.), logged fax calls are delivered to that terminal. If the telecommunications client is offline when the fax call is received, the logged fax message is delivered to it the next time it comes online. Fax calls are displayed in the telecommunications client's active call log window as shown in the figure below.

Figure 2:
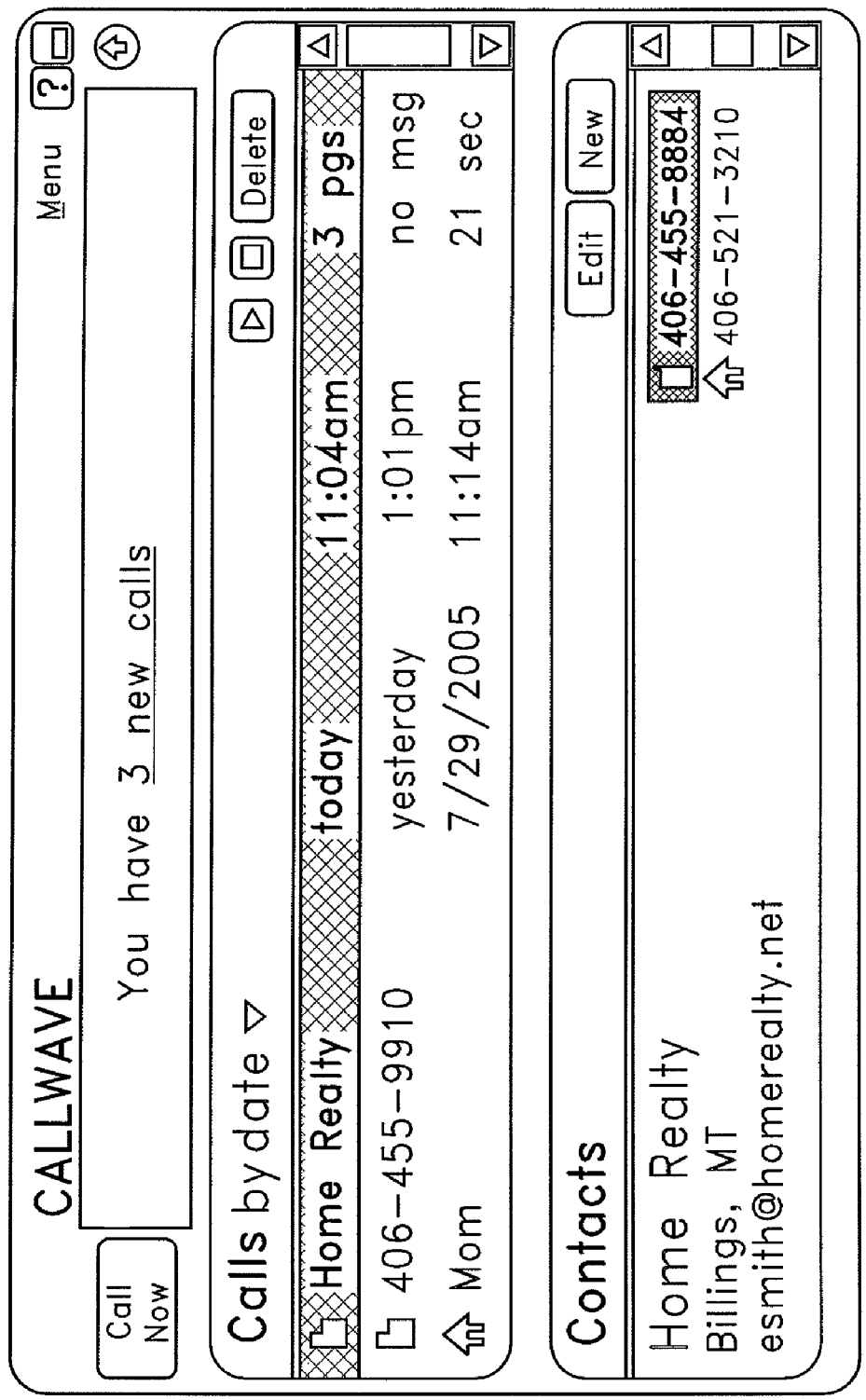
FIG. 2 illustrates a first example user interface.

FIG. 2 illustrates an example call log user interface, such as one that can be displayed via the telecommunications client. In this example interface, a fax call is indicated by a fax icon on the left and by the number of pages on the right. In the illustrated example, the first two calls were from fax devices (e.g., a dedicated fax machine, a fax server, etc.). If no fax was received during a call initiated by a fax device, a corresponding notation (e.g., "no msg") is displayed in the pages field. If the customer's account also has a voice line that is being serviced, the log would also optionally include voice calls, such as the third entry in the example above (from "Mom"). Optionally, the customer can instruct the user interface (e.g., via a menu selection or by clicking on a field title) to sort the log by name, by call type (e.g., voice message, fax call, etc.), by date, by message length (optionally, voice messages are displayed first, sorted by message length in time, then fax messages are displayed, sorted by page length, although fax messages can be displayed first, and voice messages second).

When a call is selected in the call log user interface, the associated contact record (e.g., including the caller name, address, email address, phone number, fax number, and/or other information) is optionally displayed in a Contacts area (e.g., a window).

Figure 3:
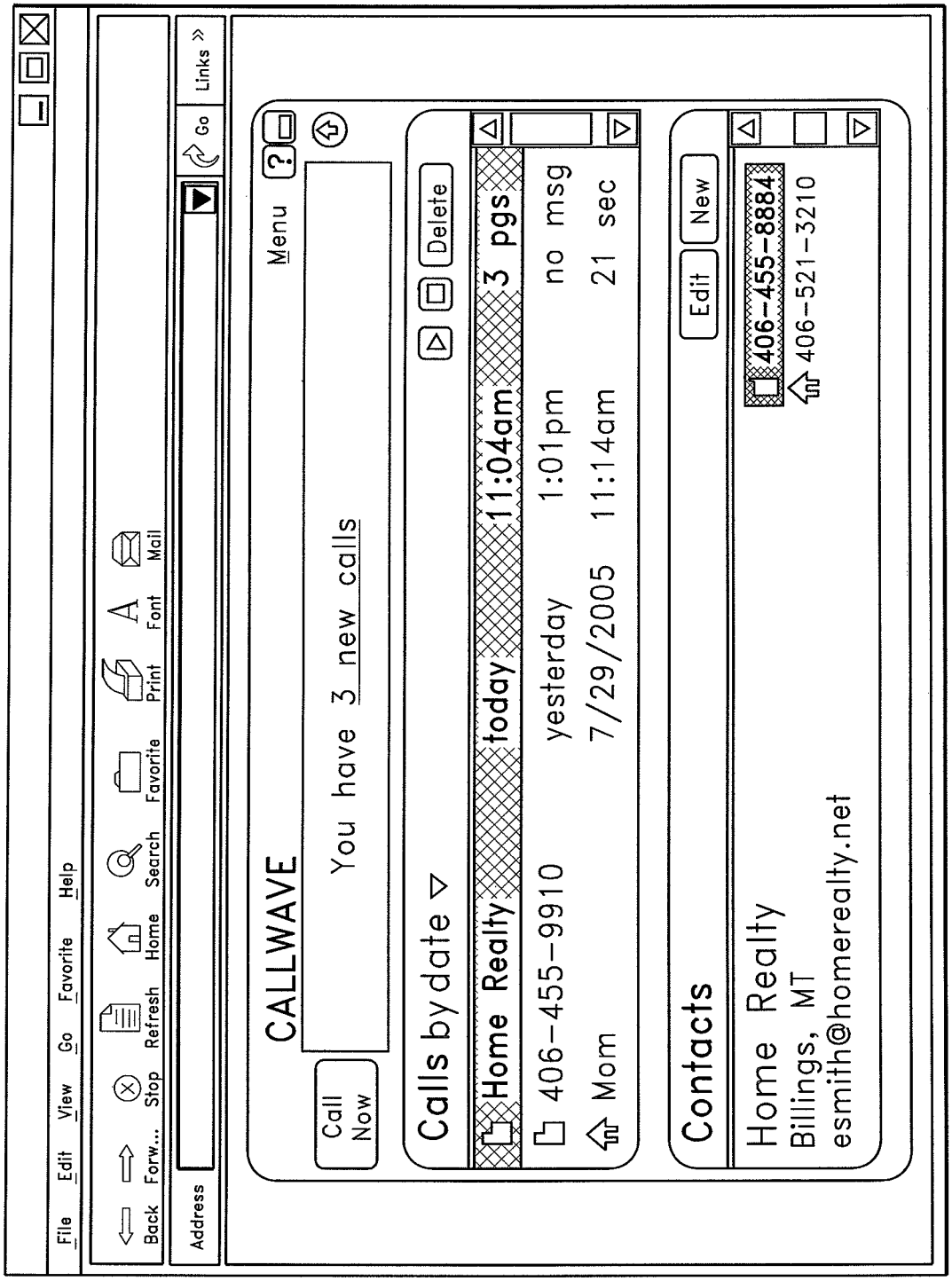
FIG. 3 illustrates a second example web user interface

To view a fax the customer clicks the play icon or double-clicks the call. This causes the viewer the customer has configured to open and display the fax. The customer is optionally provided help in installing an appropriate viewer if needed. Alternatively or in addition, the client may be configured to automatically display the entire fax when it is received (or optionally the pages as they are received from the softswitch). FIG. 3 illustrates an example call log user interface presented via a browser and accessed via a Web site (e.g., hosted by the call processing system or other system). The browser can be executing on a computer terminal, such as a personal computer, a Wireless Application Protocol (WAP)-enabled phone, a PDA or the like. The notification can be accessed by supplying the appropriate URL to the browser and optionally providing log-on information, such as a user name and a password. Optionally, the log can be transmitted both to the telecommunications client application discussed above for display on the computer terminal and accessed via a browser.

The log can list missed calls and fax calls, including the caller identity when known, the caller's phone number, when public, the time of the call, and whether the caller left a message/fax.

If caller's phone number is "private," then the phone number is optionally not displayed to the called party. Instead, the phrase "Private Number" or the like is displayed. If a contact record including an encrypted phone number corresponding to the private phone number has been previously stored in the called party's database, then a text message (e.g., the caller name or other identifier) previously entered by the customer or other entity in association with the encrypted private number is displayed. For calls placed by a phone (as opposed to a fax device) when a called party clicks on the caller's name, phone number, or the phrase "Private Number," a return call is initiated by the called party's computer. If the called party clicks on or otherwise activates the "playback" link, the message left by the caller will be played back by the computer system to the called party. Alternatively, the messages can be played back by the called party's terminal in substantially real-time as the messages are being recorded so long as the messages do not overlap in time. For calls placed by a fax device, when a called party clicks on the "Play" control or the log entry, the fax is displayed to the called party via the browser or other viewer. Optionally, the fax can also be downloaded from the Web site to the user computer or other terminal.

As discussed above, the customer may configure to receive an email notification when a fax call is received. The email notification may be optionally configured to include the fax as an attachment. The email includes name and/or phone number information (and optionally other information) about the fax sender if available. An example email notification is illustrated in FIG. 4. The example email message includes the fax sender's phone number (if available), the destination fax number (e.g., the customer's fax number), the number of pages in the fax, the date and time of the fax, and the fax file.

A widget or gadget that can provide some or all of the functionality described herein with respect to FIGS. 2 and 3, and with respect to other user interfaces. A widget can be in the form of a portable code that can be installed and executed within a Web page (e.g., an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. Other types of applications can be used as well to provide the functionality of a widget or gadget.

Still additional example fax routing processes and systems will now be described.

Figure 5:
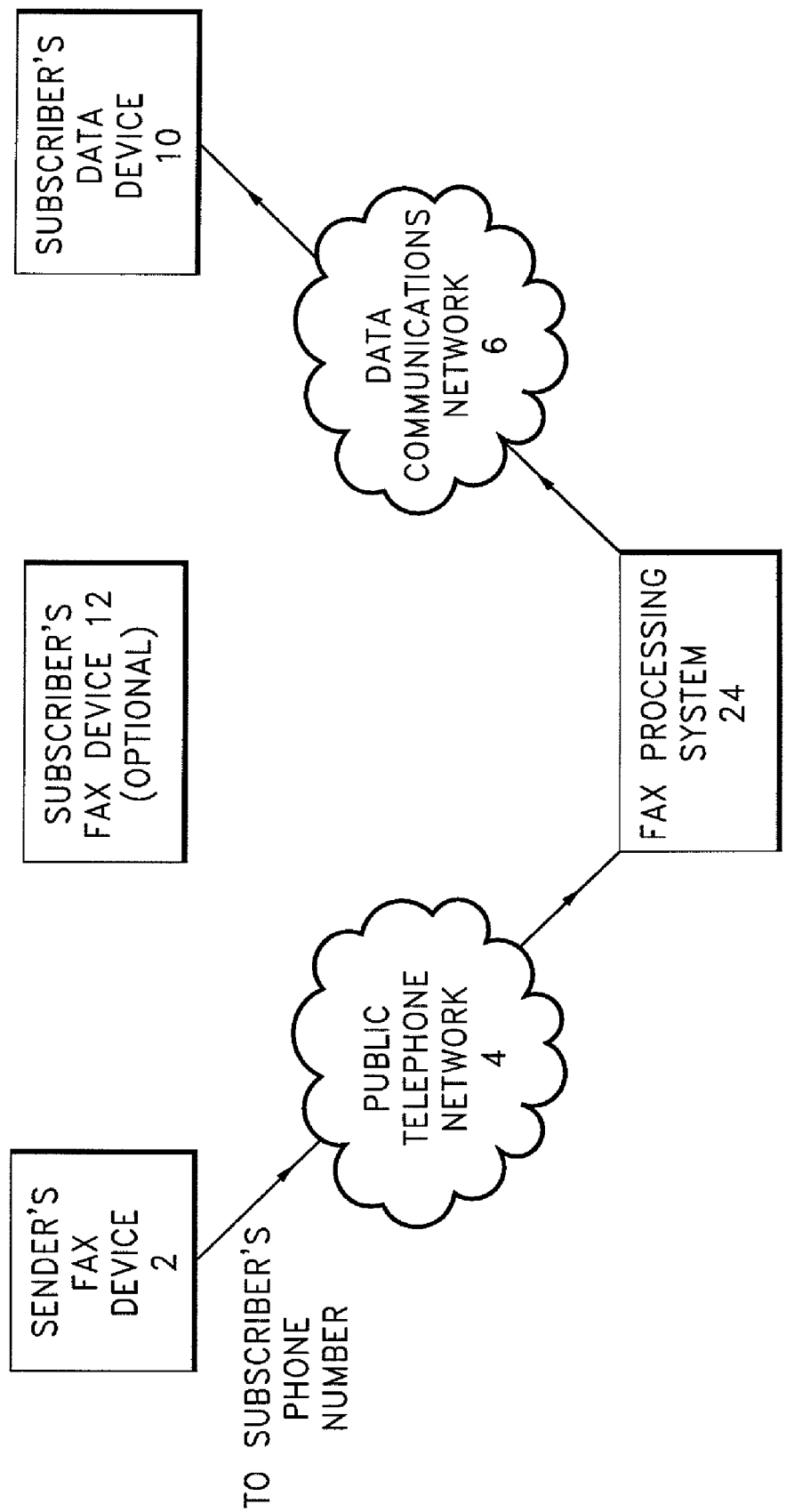
FIG. 5 is a block diagram of an example telecommunications system with fax handling capabilities.

FIG. 5 is a block diagram of another example telecommunications system with fax handling capabilities. Two networks are shown in FIG. 5: a public telephone network 4 and a data communications network 6. Examples of the public telephone network 4 include the PSTN, VoIP networks, and wireless networks. Examples of data communications network 6 include the Internet, virtual private data networks, intranets, and WANs. The data communications network 6 may carry information besides just data, for example it may carry both voice and data simultaneously.

A sender's fax device 2 is connected to the public telephone network 4 and a subscriber's data device 10 is connected to the data communications network 6. A fax processing system 24 is connected to both networks 4, 6. The connections can be made either directly or indirectly. For example, the sender's fax device 2 could be a fax machine plugged into a telephone jack or routed through a PBX. It could also be a computer (e.g., a fax server) with fax transmission software that is connected to the public telephone network 4 via a LAN and a gateway (between the LAN and the telephone network). On the subscriber side, examples of the subscriber's data device 10 include computers, PDAs, and devices that combine both voice and data (e.g., a Handspring Treo, a smartphone utilizing a Microsoft or Symbian operating system, a Blackberry from Research In Motion, LTD, etc.). The data device 10 can be connected to the data communications network 6 by any means, including for example by a dial-up connection, a broadband connection (e.g., DSL, cable, or direct fiber), a direct connection to the core of the data communications network 6, or wireless access. The connections can be either permanent or temporary. In addition, although the fax processing system 24 is shown in FIG. 5 as a single box, it should be understood that parts of the fax processing system may be distributed among the different devices 2, 10 and networks 4, 6.

In an example scenario, a sender would like to send a fax to the subscriber. The terms sender and subscriber are used loosely and may include people, companies, and computers, for example. In a direct fax-to-fax transmission, the sender's fax device 2 would dial the phone number for the subscriber's fax device 12, and the fax would be routed through the public telephone network 4 to the subscriber's fax device 12, which would then print out or otherwise display the fax.

In FIG. 5, the sender's fax device 2 initially proceeds the same as before. It functions as if to send the fax to the subscriber's phone number, but the fax call is received and handled by the fax processing system 24. For example, the fax call may be call forwarded from the subscriber's phone number to a phone number for the fax processing system 24, including call forward on busy (i.e., forward when the subscriber's phone number is busy), call forward all (i.e., forward all calls regardless of the state of the subscriber's phone number), and call forward no answer (i.e., forward if the subscriber's phone number rings but is not answered). Alternately, the subscriber's phone number may terminate at the fax processing system 24 so that the fax call is routed directly to the fax processing system. For example, the subscriber may be assigned a phone number that was originally obtained from the local phone carrier as terminating in the fax processing system 24. If the subscriber already has a phone number, it can be local number ported—i.e., ported from the local phone carrier to the fax processing system 24, so that calls terminate directly at the fax processing system.

Figure 6:
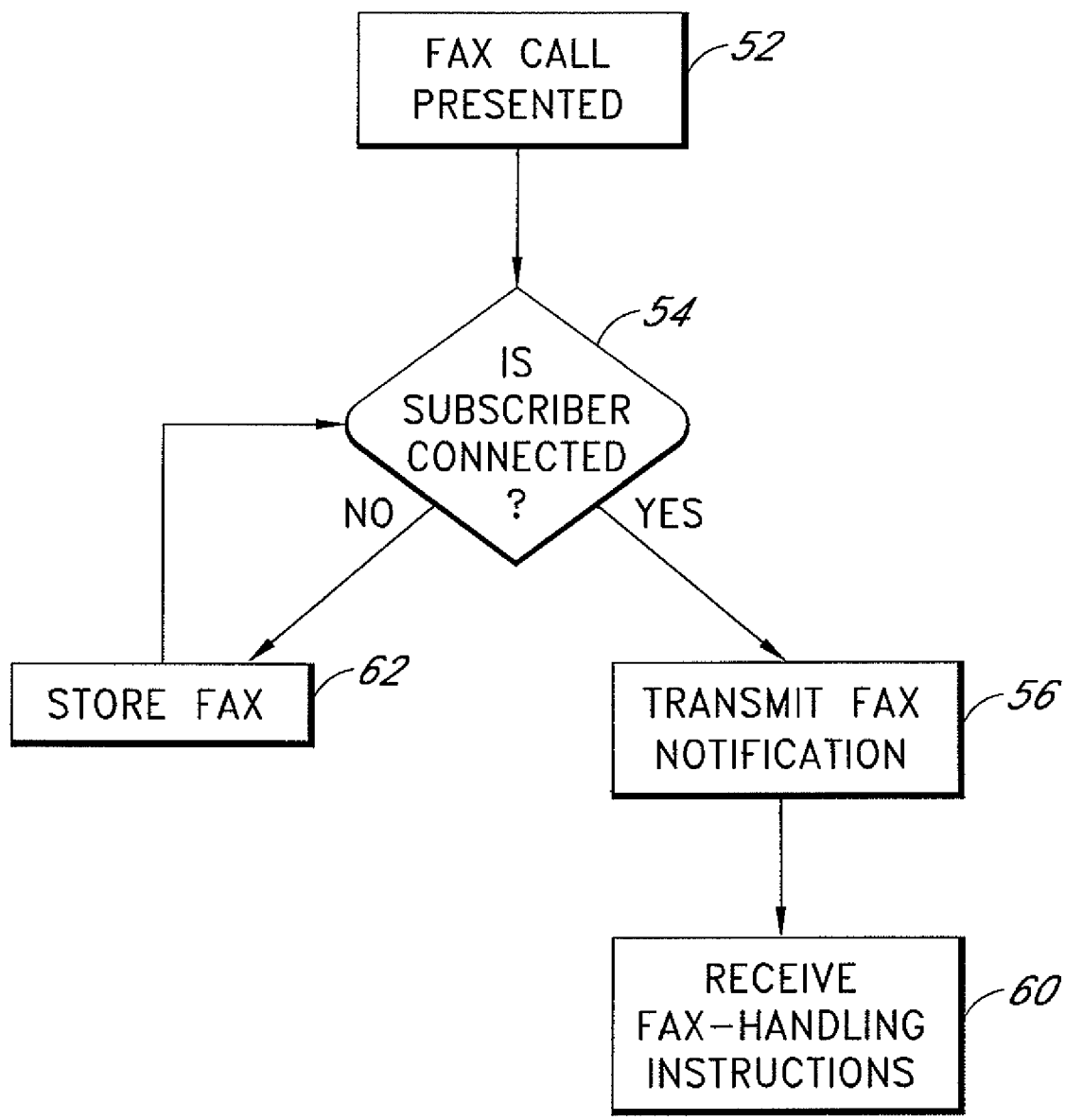
FIG. 6 is a composite flow diagram illustrating many different aspects of operation of the system in FIG. 5.

Use of the fax processing system 24 allows for more sophisticated fax handling options. FIG. 6 is a composite flow diagram that shows some of the different fax handling options that can be implemented. Different fax processing systems 24 can implement different features shown in FIG. 6. Upon receiving 52 the fax call, the fax processing system 24 can automatically handle the fax according to rules determined by the subscriber. For example, the fax processing system 24 may automatically block faxes from known telemarketers or from phone numbers on a subscriber's BLOCKED list. Alternatively, the fax processing system 24 may automatically send the fax, or a fax notification, to a network address (or addresses) specified by the subscriber.

As part of its fax handling, the fax processing system 24 may also determine 54 whether the subscriber is connected to the data communications network 6 and, if connected, the network address being used by the subscriber. If the subscriber is connected, the fax processing system 24 can immediately or in real-time notify 56 the subscriber of the incoming fax call at the subscriber's network address. Upon receipt of the notification, the subscriber may send 60 additional instructions to the fax processing system 24. In this way, the subscriber will not have to wait for the fax processing system 24 to receive the entire fax. After notifying the subscriber, the fax processing system 24 can begin streaming the incoming fax to the subscriber for display as it is being received. The subscriber may send additional instructions 60 to the fax processing system 24 in response to either receipt of the fax or the notification. In an alternate embodiment, the fax processing system 24 may automatically transmit the fax to the subscriber without first sending a fax notification.

If the subscriber is not connected to the data communications network 6, the fax processing system 24 can store 62 the fax. When the subscriber later connects 54 to the data communications network 6, fax handling can proceed as before.

The use of a fax processing system 24 has many advantages over direct fax-to-fax transmission or over current fax-to-email systems. The fax processing system 24 can be used to implement more sophisticated call handling features, for example using rules based on the sender's phone number or time of day. If the fax processing system 24 is accessible by the subscriber (e.g., over the Internet), then it may be simple for the subscriber to change the rules whenever he likes. The fax processing system 24 also allows the subscriber to more easily change or use different phone numbers and network addresses. For example, the subscriber may use different phone numbers for different purposes (e.g., one for business faxes, one for personal faxes, one for faxes from creditors). Different rules may apply to the different phone numbers, but faxes from all phone numbers may be sent to the same network address so that the subscriber can view all faxes from a single network address. Alternatively, the subscriber can use multiple network addresses so that he can view faxes from a number of different locations or data devices.

The streaming aspect, if implemented, allows subscribers to handle faxes in a more real-time fashion. For example, two colleagues may be working on a document and one wants to share a drawing with the other. He can fax the drawing to his coworker's phone number, and the drawing is streamed to the coworker's desktop. Compare this to a fax-to-email system where the entire fax must first be received, then packaged as an attachment to an email, and then sent to the coworker. Assuming that the email with attachment is not stripped by firewalls or other protections, the coworker must then wait for delivery (which often can be delayed), and then must open the email and then the attachment. Other advantages will be apparent.

FIGS. 7-11 illustrate a specific implementation of the system shown in FIGS. 4-5. In this example, the public telephone network 4 includes the PSTN 104 and the data communications network 6 includes the Internet 106. The sender's fax device 2 is a simple fax machine 102. The subscriber's data device 10 is a computer 110, which the subscriber is using to access the Internet 106 via a dial-up connection. The subscriber has signed up for a Fax Line (FL) service, in which a phone number is assigned to the subscriber for the purpose of receiving faxes. This phone number terminates at the fax processing system 124 and does not normally terminate in the sender's physical fax machine, if he even has one.

Figure 8:
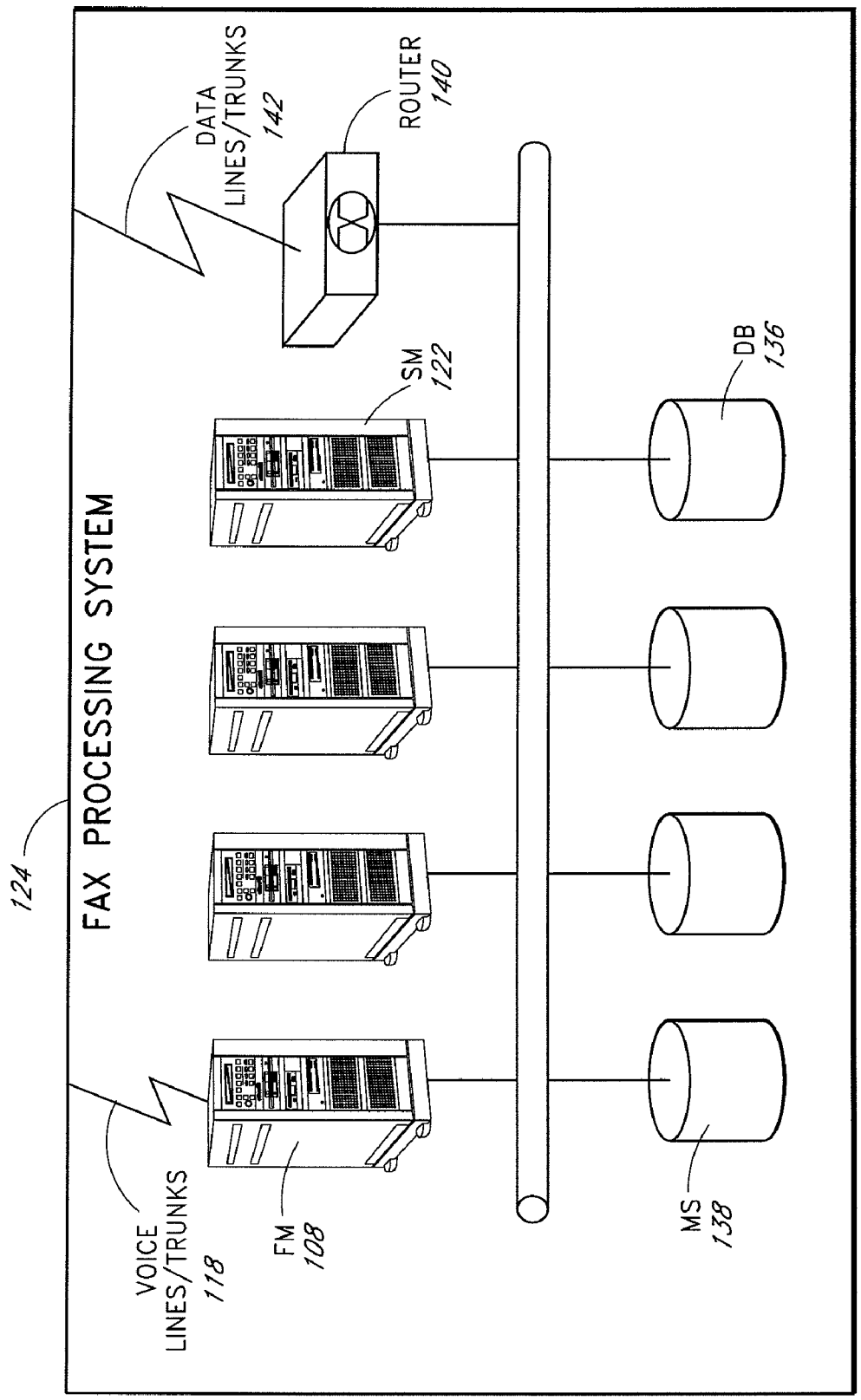
FIG. 8 is a block diagram showing further details of the fax processing system of FIG. 7.

FIG. 8 shows details of one implementation of the fax processing system 124. It includes a fax management (FM) subsystem 108, a router subsystem 140, an online presence-detection Internet session management (SM) subsystem 122, a shared media storage (MS) subsystem 138, and a database (DB) subsystem 136. Taking each subsystem in turn, the fax management subsystem 108 interfaces to the PSTN 104 and manages inbound fax calls and outbound fax or voice calls. Router subsystem 140 interfaces to the Internet 106 and manages communications between subscriber data devices and the various servers. The online presence-detection Internet session management subsystem 122 monitors the status of subscriber data devices to determine availability for fax notification and delivery services. The shared media storage subsystem 138 persistently archives fax messages. The database subsystem 136 contains records for the subscribers, including rules to be applied for fax handling. It may also store the subscriber's address book and/or preferences. These various subsystems may be interconnected via Local Area Networks (LAN), private virtual networks running over the Internet and/or Wide Area Networks (WAN).

Referring back to FIG. 7, the sender's fax machine 102 is connected to a local exchange carrier (LEC) switch via telephone lines 134. The fax machine 102 can be directly connected to the LEC over conventional POTS (Plain Old Telephone Service) lines or via local extension lines behind a corporate Private Branch Exchange (PBX). Alternatively, the fax machine 102 could be a computer with a fax modem connected to a LEC switch via telephone lines 134.

A ten-digit North American telephone number (shown as 131) is assigned to the subscriber during the FL registration process. Calls to the FL phone number 131 route through the PSTN via InterExchange Carrier (IXC) switches and/or Local Exchange Carrier (LEC) switches to eventually terminate at the fax processing system 124. The fax machine 102 and the assigned FL phone number 131 can be connected to the same switch or different switches. If the fax machine 102 and FL number 131 are coupled to the same switch, the switch will be local to both the calling and called parties, as with intra-LATA or local calls. If the fax machine 102 and FL number 131 are coupled to different switches, each switch may be local only to one of the parties, as is the case for non-local calls such as inter-LATA (long-distance) calls.

In the example of FIG. 8, the FM subsystem 108 is connected to the PSTN 104 through voice trunk circuits 118 that directly interface with the Inter Exchange Carrier's (IXC) circuit-switched or packet-switched telephony network. Thus, advantageously, the fax processing system 124 does not have to be directly serviced by the same Local Exchange Carrier (LEC) switch or PBX as the fax machine 102. Because of this, the fax processing system 124 or its individual subsystem components can be located in a different geographical area (for example, a different country) than the sender and subscriber. In this embodiment, the fax processing system 124 is locally attached to a LEC switch with a physical line or local trunk interface circuit. In such cases, the switch may or may not be serving fax machine 102. In yet another embodiment, the FM subsystem 108 may be connected to the PSTN 104 via a VoIP (Voice over Internet Protocol) network and associated routers 142.

The FL trunk circuits 118 are not limited to a particular signaling convention. For example, the present invention can be utilized with a Common Channel Signaling (CCS) system, such as Signaling System 7 (SS7), that has separate voice/user data and signaling channels. In addition, the present invention can be used with other signaling methods, such as the following trunk-side signaling interfaces: ISDN-PRI, Advanced Intelligent Network (AIN), and/or Service Node architectures. Preferably, the selected signaling system provides a suite of call-presentation information to the fax processing system 124, including one or more of the following:

ANI—Automatic Number Identification ("Caller ID"): phone number and privacy indicator of the calling party (the sender in this example).

DNIS—Dialed Number Identification System: phone number of the called party (the FL phone number in this example).

The telephone line 114 may be shared with one or more computer terminals. For example, telephone 112 shares the telephone line 114 with a computer terminal 110. In this example, the telephone line 114 is used to establish a dial-up connection for a computer terminal 110, via the computer modem, to an Internet Service Provider (ISP) offering dial-in remote-access service connections from the PSTN 104 via trunk interface circuits 120. The computer terminal 110 can also be connected to the Internet 106 via a broadband connection (such as a DSL or cable modem service, or a T1 line). While the subscriber's data device is shown as a computer terminal 110 in FIG. 7, it can also be an interactive television, a network-enabled personal digital assistant (PDA), another IP (Internet Protocol) device, or the like. If the computer terminal 110 is a personal computer, it can be equipped with a monitor, keyboard, mouse, disk drive, sound card (or similar sound-reproduction circuitry, such as a codec), streaming media playback software (such as the Media Player program available from Microsoft), speakers, and a modem (such as a standard V.90 56K dial-up modem or other modem).

In this implementation, a client application 116 for the fax processing system 124 resides and executes on the computer terminal 110. The client application 116 is connected to, and communicates with, the fax processing system 124 via the Internet 106. The fax processing system 124 and the client application 116 can optionally be used with the trigger-based fax handling processes and system described above.

The fax processing system 124 optionally hosts a web site used by subscribers of the FL service to set up and manage their accounts. Set-up and management functions can be implemented by the client application 116 as well.

The SM subsystem 122 monitors the Internet for online IP devices registered to subscribers to determine their availability for receiving faxes. When a subscriber connects to the Internet using a dial-up ISP, for example, the client application 116 makes the subscriber's online presence known to the fax processing system 124. Presence detection can be performed by the SM subsystem 122 polling or pinging the client application 116, or by the client application 116 transmitting a "Login/I'm alive" message and/or subsequent periodic "Keep alive" messages to the SM subsystem 122. This is just one example of presence management. Broader presence management techniques could be employed including IETF SIMPLE technology.

If, rather than using a dial-up connection, the subscriber is using a broadband, always-on connection, such as a DSL or cable modem service, the client application 116 typically becomes active when the computer terminal 110 is turned on or powered up, and it stays on until the subscriber manually shuts down the client application 116 or the computer 110 is turned off or powered down.

Figure 7:
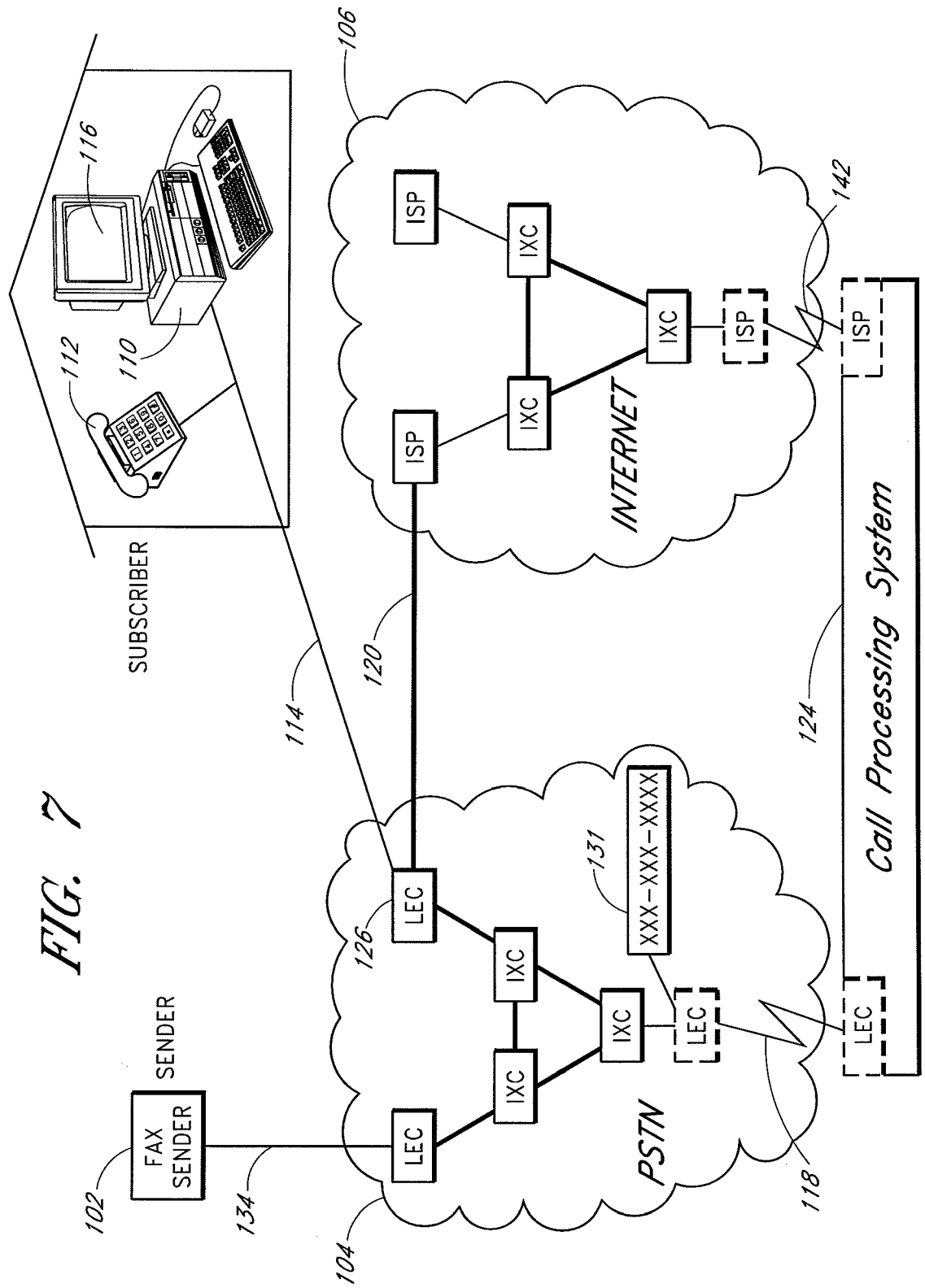
FIG. 7 is a block diagram of an example implementation of the system of FIG. 5.
Figure 9:
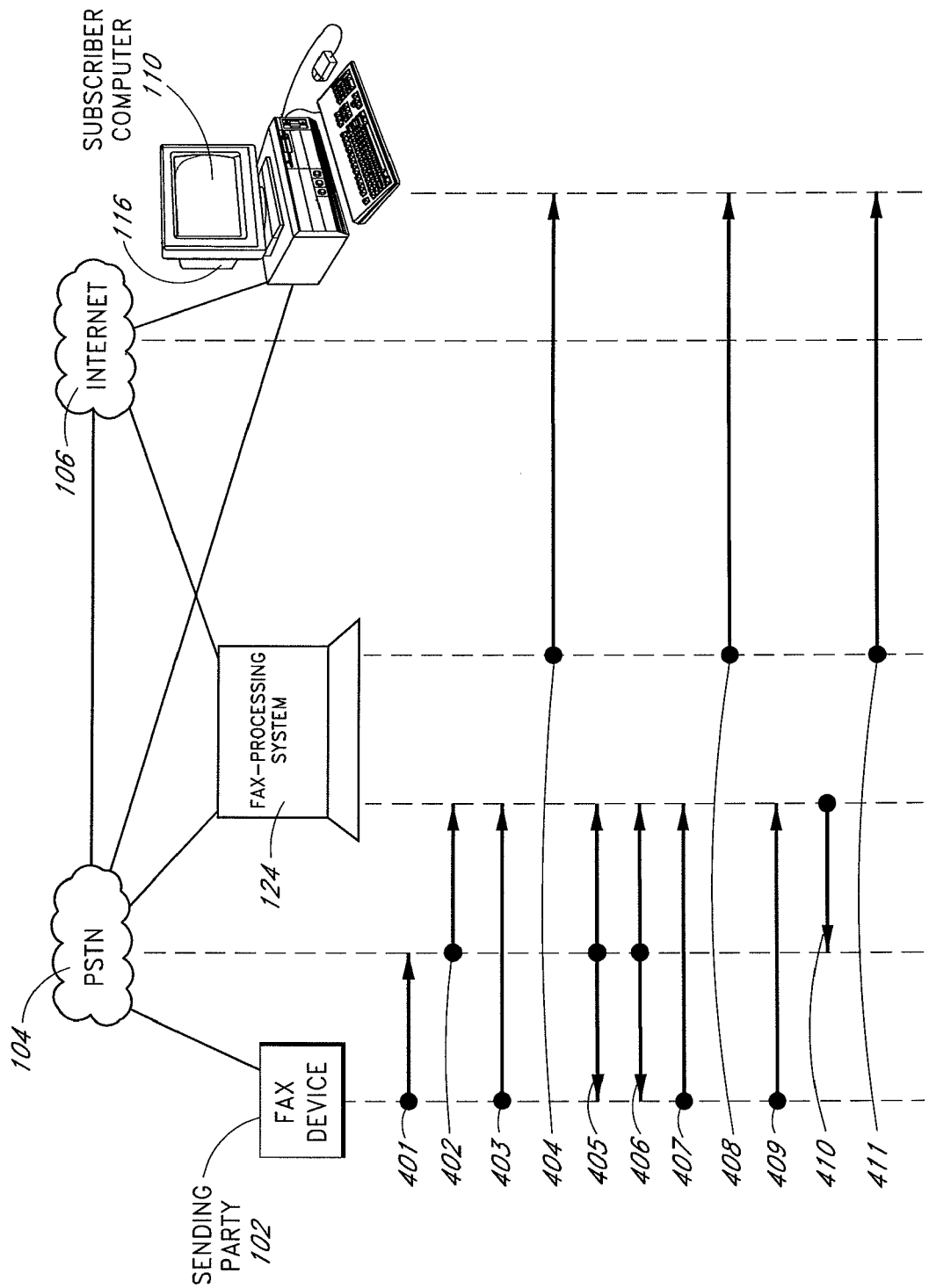
FIG. 9 is a call-flow diagram illustrating an example function implemented by the system of FIGS. 7 and 8.

FIG. 9 is a call-flow diagram that illustrates one example of fax handling. For clarity, the full details shown in FIGS. 7 and 8 are not repeated in FIG. 9. In this example, the sending party is associated with fax machine 102 and the subscriber's phone number is the one assigned to the subscriber as part of the FL service. The FL service is set up to transmit a fax call notification and stream the inbound fax to the subscriber.

The sending party initiates a fax call using his fax machine 102 by dialing 401 the subscriber's FL number 131. The PSTN 104 routes 402 this call to the FM subsystem 108 in the fax processing system 124. The fax processing system 124 receives 403 the incoming call and based at least in part on the phone number called (obtainable by DNIS for example), the FM subsystem 108 queries the SM subsystem 122 and the DB subsystem 136 to determine whether the called number is registered to a subscriber, what the subscriber's fax handling preferences are, and whether the subscriber is online.

If the FL subscriber's computer terminal 110 is online, the FM subsystem 108 opens a communication channel over the Internet 106 to the client application 116 running on the subscriber's computer terminal 110. The fax processing system 124 transmits 404 a fax call notification to the subscriber's computer terminal 110.

If available, and if not designated as private, the Caller ID of the sending party is transmitted 404 to the client application 116 and displayed along with an optional sound notification. The Caller ID may come from different sources. For example, the sending fax device may provide caller identification information, or it may be provided during setup of the call by the telephone network. The information may also be automatically entered into the subscriber's address book. The sound notification can be in the form of ringing, which is produced through the called party's computer terminal 110 speakers. In addition, the FM subsystem 108 performs a Caller Name database lookup using the Caller ID of the calling party. The Caller Name, if available, is transmitted 404 to the client application 116 and displayed to the subscriber.

Around the same time (it may be before or after), the fax processing system 124 answers 405 the incoming call and establishes 405 a full duplex, (two-way) talk path with the sending party. The fax processing system 124 negotiates 406 a fax transmission session with the fax machine 102 and begins to receive the fax. The FM subsystem 108 records and stores the caller's fax message in the MS subsystem 138 while simultaneously streaming 408 the fax through the opened Internet channel to the client application 116 on the subscriber's computer terminal 110. The client application 116 launches the computer terminal's 110 image-viewing software (for example, Adobe Acrobat) to display the streamed fax pages on the computer terminal's 110 monitor. The fax transmission 408 to the subscriber can begin regardless of whether the entire fax has been received 407 by the fax processing system 124.

When the sending fax machine 102 completes the fax transmission, it terminates 409 the call. The fax processing system 124 then releases trunk resources and signals 410 Call termination to the PSTN 104. The fax processing system 124 also signals 411 completion of the fax transmission to the subscriber by sending a corresponding control message which is displayed to the subscriber via the client application 116 as an entry in the call log(for example, 5 page fax 610).

Steps 401-411 illustrate one approach for streaming of a fax to a subscriber. Many variations will be apparent. For example, if the subscriber's connection to the Internet 106 is a narrow-band dial-up connection over a telephone line 114, a hybrid real-time solution can be used. Instead of transmitting the fax to the subscriber's computer terminal 110 at the maximum data rate possible, the FM subsystem 108 working in conjunction with the client application 116 begins to "trickle" download the fax from the MS subsystem 138 to the subscriber's computer terminal 110 over the open Internet communication channel 106. In one approach, the fax is divided into smaller files that are downloaded and reassembled by the client application 116 on the subscriber's computer terminal 110. In another, the fax is simply transmitted at a lower data rate than the maximum available, for example in order to reduce congestion across the subscriber's Internet connection. Whatever the implementation, trickle download helps ensure that bandwidth is available to the subscriber for other purposes. The trickle download can transition to a faster download, for example if the subscriber requests to view the fax immediately. The trickle download may also be interrupted if the Internet connection 114, 120, 142 is terminated. On the next Internet connection, the client application 116 can resume the trickle download where it left off. In some cases, downloads will be visible to the subscriber as an active call state, as shown for example in a pop-up window. Alternately, the subscriber can determine the data rate used to download the fax.

In another variation, a client/server protocol can be designed to operate through private and public firewalls. In this approach, the client application 116 opens a channel through the firewall by initiating "trusted" communication from inside the firewall to the fax processing system 124 outside the firewall. The client application 116 sends a "keep alive" packet through the firewall, over the Internet channel 106 to the SM subsystem 122. This "keep alive" message creates an open channel through the firewall along with a back channel from the SM subsystem 122 to the client application 116 to allow a reply with an acknowledgement message. When a new fax call is presented at the FM subsystem 108, the FM sends a call presented message to the SM subsystem 122, which relays the message to the client application 116 over this back channel. The call presented message includes the network address of the FM and can be used by the client application 116 to initiate streaming of the fax message by directly sending a new message to the FM subsystem 108 thereby opening an additional pair of communication paths. The FM subsystem 108 then acknowledges receipt of this message from the client and begins delivering the stream of fax content on the additional back channel.

Figure 10:
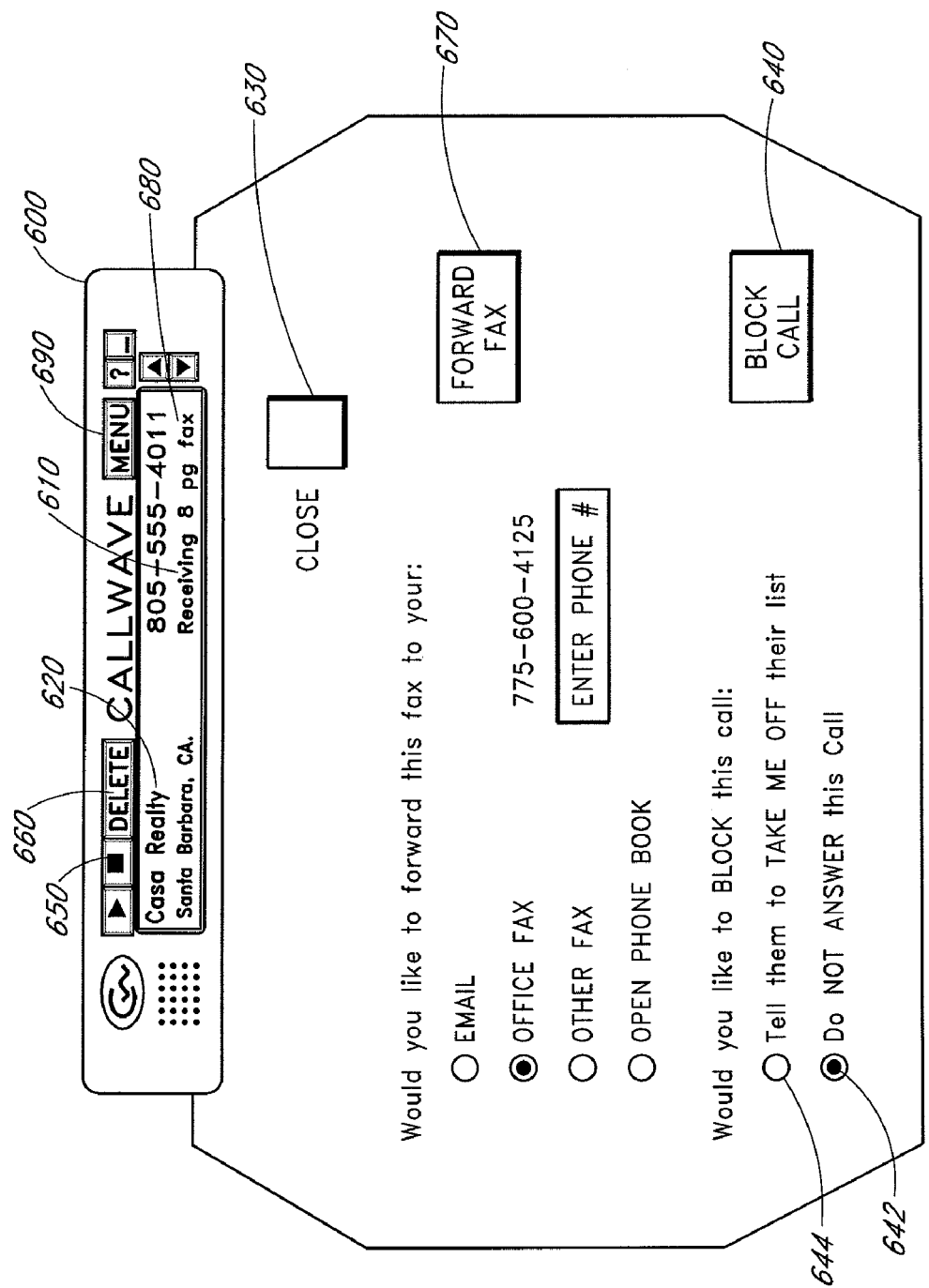
FIG. 10 is a graphical depiction of an example display of a fax notification with options for additional fax handling.

In addition to receiving faxes or fax notifications, the subscriber may also be presented with different fax handling options. FIG. 10 shows a pop-up dialog menu that contains a fax notification 600 (including the Caller ID 610 and Caller Name 620 in this case) and which also contains options for additional fax handling.

If the subscriber ignores the notification pop-up menu, the fax processing system 124 will handle the fax according to the subscriber's default rules. For example, the subscriber may have selected for the fax to be automatically streamed to his computer terminal. Alternately, the subscriber may have selected for the fax to be stored until the subscriber affirmatively elects to retrieve the fax.

Alternately, the subscriber may choose to ignore the incoming fax. For example, the fax may not have been urgent enough to interrupt what the subscriber was doing, or the fax may have been intended for another member of the household. The subscriber can close the fax handling options dialog box shown in FIG. 10 using the "CLOSE" option 630, which will instruct the fax processing system 124 that no further fax handling instructions will be arriving from the subscriber. The fax processing system 124 will then take appropriate actions. In one approach, the fax processing system 124 will wait until the entire fax has been received and then will transmit the fax in the background to the subscriber's computer terminal 110. The client application's 116 call log, which lists the faxes handled by the fax processing system 124 for the subscriber, is updated. At this point, the fax is available locally on the computer terminal 110 for viewing at the subscriber's convenience. It is also archived in the MS subsystem 138, so that it can be viewed from other computer terminals.

Figure 11:
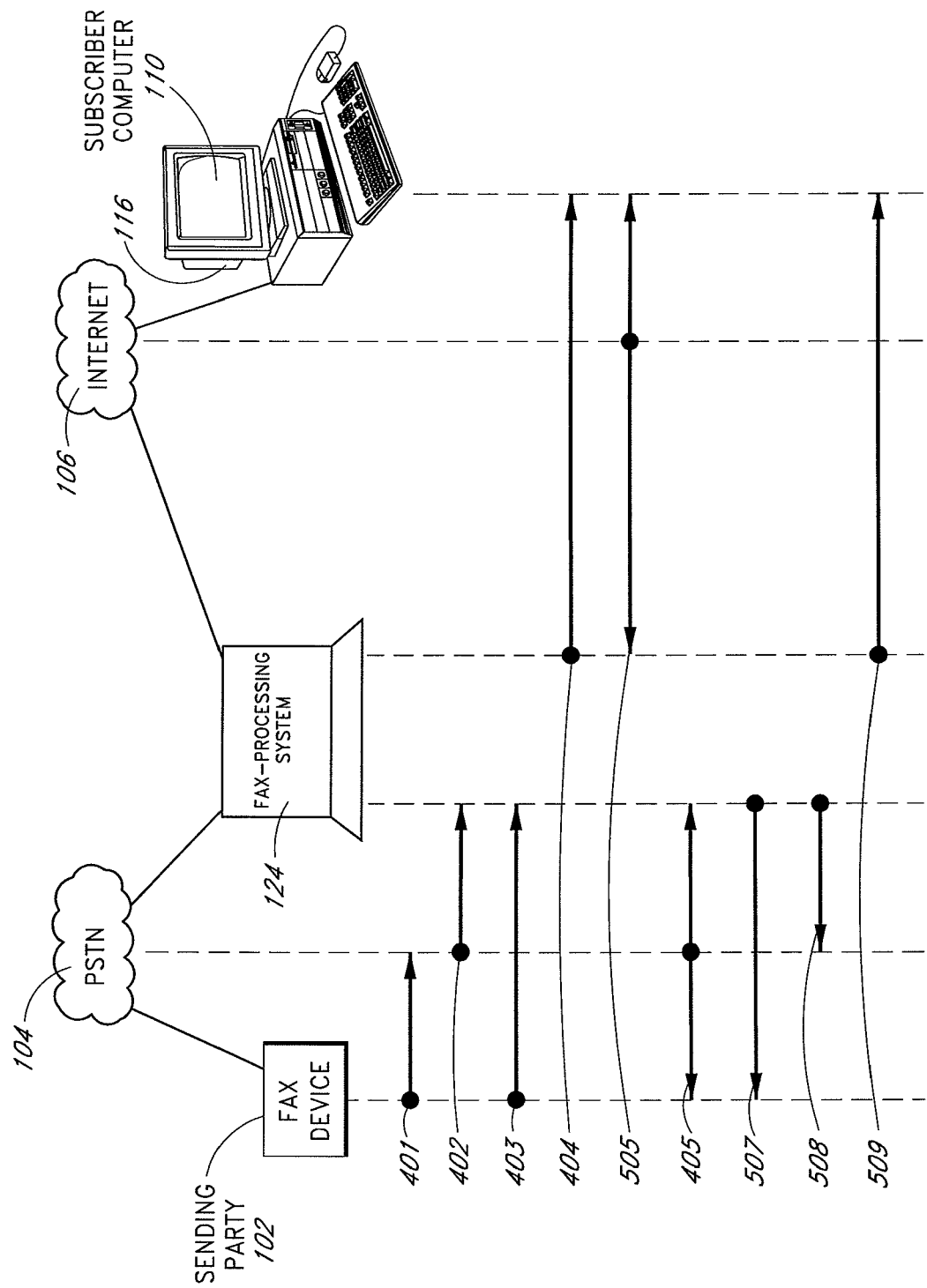
FIG. 11 is a call-flow diagram illustrating another example function implemented by the system of FIGS. 7 and 8.

As another option, the subscriber may choose not to accept calls from the sending party. Referring to FIG. 11, steps 401-405 take place as in FIG. 9. Having screened the fax call, the subscriber can signal 505 the fax processing system 124 to abort the fax reception and to communicate the request not to be called in the future. For example, the subscriber can activate the "BLOCK CALL" option 640. In this example, the subscriber can either select a "Do NOT ANSWER this Call" option 642 or a "Tell them to TAKE ME OFF their list" option 644. The client application 116 sends 505 a corresponding instruction to the fax processing system 124. Upon receiving the "Do NOT ANSWER this Call" instruction, the fax processing system 124 interrupts recording of the fax and/or deletes the recorded fax. Upon receiving the "Tell them to TAKE ME OFF their list" instruction, the fax processing system 124 also plays 507 a voice prompt to the sender, such as "The person you have called does not accept solicitations. Please remove this phone number from your calling list. Thank you and goodbye." The fax processing system 124 disconnects 508 the call and makes 509 a corresponding entry in the subscriber's call log (e.g., telemarketer). In yet another option, the fax processing system 124 can send a "canned reply" fax to the sender. This reply formally requests that the sender remove the subscriber from their fax broadcast list.

The options dialog box could pop an additional query to determine if the subscriber would like the fax processing system 124 to always apply this treatment to future calls from this sender phone number. This automatic fax handling rule can be stored in a table of subscriber preference settings for the fax processing system 124, for example in DB subsystem 136 as a simple extension table of the subscriber's address book. If directed to do so, the fax processing system 124 would automatically block future calls from this sender and relieve the subscriber from having to handle them.

As another variation, the subscriber can monitor the Caller ID and Caller Name of the incoming call and decide not to accept calls from this sender. The fax processing system 124 could be optionally configured to delay answering the incoming fax for a fixed time interval or for a specific number of ring cycles in order to allow the subscriber time to review the Caller ID and Caller Name. If the client application 116 instructs the fax processing system 124 to block the call before the incoming call has been answered, the fax processing system 124 will ignore the call (that is, let it ring) or reject it with an appropriate error tone and/or audible error message; e.g., a network reorder tone or special information tone along with a system error announcement (these methods can defeat fax spam systems). If the client application 116 instruction comes after the incoming call has been answered, the fax processing system 124 will handle the fax as described above.

The client application 116 provides the subscriber with additional utility including but not limited to: the ability from the menu option 690 to forward the fax as an attachment to an email address or fax to another fax number, delete the fax from the call log 660, launch a viewer 650 to display the fax on the computer or on a printer, scroll through a list of voice and fax calls 680, and undelete a previously deleted fax from the menu option 690.

As another variation of fax handling, the following process describes a scenario when the subscriber's computer terminal 110 is offline. When the fax call arrives on one of the FL trunks 118, along with the signaling information, the FM subsystem 108 queries the SM subsystem 122 and/or the DB subsystem 136 using the incoming call's DNIS (called number) to determine whether the call is for a registered subscriber, what the subscriber's online/offline presence status is, and to retrieve that subscriber's fax handling preference rules. If the fax processing system 124 determines that the subscriber is not connected (i.e., he is offline or otherwise unavailable), the fax processing system will carry out default rules for handling the call. These default rules may be the same for all subscribers or they may be individually determined by subscribers.

An example default rule is to answer the call and record the fax, for later notification and/or transmission when the subscriber comes online. Other fax handling rules could include the fax handling options described previously. For example, the CM subsystem 108 may optionally block the incoming fax based on the Caller ID. Regardless, when the subscriber subsequently connects to the Internet over a broadband or dial-up connection 114, 120, the client application 116 checks in with the SM subsystem 122. Client synchronization allows faxes not previously received by the client application 116 to be presented. In this implementation, new faxes delivered by synchronization are treated in the same fashion as new calls that were received directly by the client application 116 when the subscriber's computer terminal 110 was online. Furthermore, the process of trickle or burst downloading of faxes can begin as described above. As an additional option, a message-waiting indication can be activated or a Short Message Service (SMS) message or paging alert sent if any new faxes are placed into the call log. Message-waiting indication is active until the faxes have been viewed or the message-waiting light/icon has been deactivated by the subscriber.

FIGS. 9-11 illustrate some specific examples of features implemented by a fax processing system 124. Other features will be apparent. For example, rather than transmitting the fax or fax notification to a single network address for the subscriber, the fax processing system 124 could broadcast the fax to multiple network addresses or even to network addresses for multiple subscribers. Alternately, the faxes could be transmitted to one or more fax devices. Routing of the faxes can be determined by rules determined in advance, or by instructions received from the subscriber (for example via a pop-up dialog menu).

The detailed description contains many specifics. These should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the claims. Therefore, the scope of the invention should be determined by the claims and their legal equivalents. Furthermore, no element, component or method step is intended to be dedicated to the public regardless of whether the element, component or method step is explicitly recited in the claims.

What is claimed is:

1. A method of processing facsimiles, the method comprising:
    receiving at a call processing system a first message transmitted from a first carrier system at least partly in response to the first carrier system receiving a call from a caller directed to a user phone address, the first message including a phone address associated with the caller and an identifier associated with the user;
    using information in the first message to determine if the user is a subscriber of a first service offered by the call processing system; and
    if the user is a subscriber of the first service offered by the call processing system:
        receiving a facsimile via the call at the call processing system;
        logging the call in a first call processing system call log;
        determining if a user telecommunications client is online, and if the telecommunications client is online, enabling the client and call log to synchronize with at least a portion of the first call processing system so that the call is included in a call log displayed via a client application.

2. The method as defined in claim 1, wherein the first carrier system transmits the first message at least partly in response to a condition set on a user line being satisfied.

3. The method as defined in claim 2, wherein the condition is a busy or ring no-answer condition.

4. The method as defined in claim 2, wherein the condition is an Advanced Intelligent Network (AIN) trigger.

5. The method as defined in claim 1, wherein the client log entry for a call includes the number of facsimile pages.

6. The method as defined in claim 1, wherein the client log entry for a call includes information related to the length of the facsimile, the time of the call, and/or the caller identity.

7. The method as defined in claim 5, wherein the client is configured to display the facsimile at least partly in response to a user action.

8. The method as defined in claim 5, wherein the client is configured to automatically display the facsimile.

9. The method as defined in claim 5, wherein the client is configured to display voice call log entries and facsimile call log entries.

10. The method as defined in claim 9, wherein the client is configured to indicate whether there is a voice message associated with a call log entry.

11. The method as defined in claim 1, wherein the user phone address is used for receiving voice communications and facsimiles.

12. The method as defined in claim 1, wherein the call processing converts the facsimile from a first format to a format specified by the user prior to delivering the facsimile to the user.

13. The method as defined in claim 12, wherein the call processing system converts the facsimile from a first format to a format specified by the user substantially immediately after the call processing system receives the facsimile.

14. The method as defined in claim 12, wherein the call processing system converts the facsimile from a first format to a format specified by the user substantially immediately before the call processing system transmits the facsimile to a user terminal.

15. The method as defined in claim 1, wherein the first carrier system includes at least a Service Switching Point and the call processing system includes at least a Service Control Point.

16. The method as defined in claim 1, the method further comprising:
    accessing from memory facsimile-related instructions previously provided at least in part by the user, including an instruction regarding one or more user specified destinations for facsimile receipt; and
    transmitting the facsimile to at least one user specified destination.

17. The method as defined in claim 16, wherein the one or more user specified destinations includes an email address.

18. The method as defined in claim 16, wherein the one or more user specified destinations includes an SMS address and/or an MMS address.

19. The method as defined in claim 1, the method further comprising obtaining information regarding the caller from at least one of the following:
    a customer contact data store;
    a call processing system name cache;
    a CNAM (Calling Name) database;
    a Line Information Database (LIDB);
    and providing at least a portion of the obtained information to the user in association with the facsimile.

20. The method as defined in claim 1, the method further comprising:
    determining if the user has an existing contact record for the caller; and
    if the user does not have an existing contact record for the caller, creating a call record for the caller using at least a portion of the first message information.

21. The method as defined in claim 1, the method further comprising using at least a portion of the first message information to determine if the user has indicated whether facsimiles from the caller are not to be delivered to the user.

22. The method as defined in claim 1, the method further comprising the call processing system determining that the call is a facsimile related call by comparing the user phone address with information stored in at least one database.

23. The method as defined in claim 1, wherein the call processing system causes the first carrier system to connect the call to the call processing system via a second message transmitted to the first carrier system at least partly in response to the first message.

24. The method as defined in claim 23, wherein the second message is an AIN-based message.

25. The method as defined in claim 1, the method further comprising causing, at least in part, call frequency information associated with the caller to be updated.

26. The method as defined in claim 1, wherein the facsimile is streamed from the call processing system to a user terminal, wherein at least a portion of the facsimile is received at the terminal before the call processing system receives all of the facsimile.

27. The method as defined in claim 1, wherein the client is in the form of a widget and/or gadget.

28. The method as defined in claim 27, wherein the first carrier system transmits the first message at least partly in response to a condition set on a user line being satisfied.

29. The method as defined in claim 1, wherein the identifier associated with the user is a user phone address and/or an account number.

30. The method as defined in claim 1, wherein the facsimile is downloadable by the user from a Web site associated with the call processing system.

31. The method as defined in claim 30, wherein the condition is a busy or ring no-answer condition.

32. The method as defined in claim 30, wherein the condition is an AIN trigger.

33. A method of processing facsimiles, the method comprising:
    receiving at a call processing system a first message transmitted from a first carrier system regarding a call to a phone address associated with a user while the call is in progress, the first message including an identifier associated with the user, wherein the call is a facsimile call;
    using the identifier to determine if the user is authorized to receive services offered by the call processing system;
    at least partly in response to determining that the user is authorized:
        transmitting a second message to the first carrier system, the second message indicating that the first carrier system is to connect the call to the call processing system;
        connecting to the call at the call processing system;
        receiving a facsimile via the call at the call processing system; and
        providing over a network information regarding the facsimile call, wherein some or all of the information is displayed in a call log visually accessible by the user.

34. The method as defined in claim 33, the method further comprising:
    logging the call in a first call processing system call log;
    determining if a user telecommunications client is online, and if the telecommunications client is online, causing, at least in part, the client and call log to synchronize with at least a portion of the first call processing system call log so that the call is included in a call log displayed via the client application.

35. The method as defined in claim 33, wherein the information regarding the facsimile call includes a phone address associated with the caller.

36. The method as defined in claim 33, wherein a log entry for the call includes information related to the length of the facsimile, the time of the call, and/or the caller identity.

37. The method as defined in claim 33, wherein the call log is configured to display voice call log entries and facsimile call entries, wherein a first call-type identifier is displayed in the call log in association with facsimile call entries to visually distinguish facsimile call entries from voice call entries.

38. The method as defined in claim 37, wherein the call is configured to indicate whether there is a voice message associated with a call entry.

39. The method as defined in claim 33, wherein the user phone address is used for receiving voice communications and facsimiles.

40. The method as defined in claim 33, wherein the call processing converts the facsimile from a first format to a second format previously specified by the user prior to delivering the facsimile to the user.

41. The method as defined in claim 33, wherein the first carrier system includes at least a Service Switching Point and the call processing system includes at least a Service Control Point.

42. The method as defined in claim 33, the method further comprising:
    accessing from memory facsimile-related instructions previously provided at least in part by the user, including an instruction regarding one or more user specified destinations for facsimile receipt; and
    transmitting the facsimile to at least one user specified destination.

43. The method as defined in claim 42, wherein the one or more user specified destinations includes an email address.

44. The method as defined in claim 42, wherein the one or more user specified destinations includes an SMS address and/or MMS address.

45. The method as defined in claim 42, wherein the facsimile accompanies the notification.

46. The method as defined in claim 33, the method further comprising obtaining information regarding the caller from at least one of the following:
    a customer contact data store;
    a call processing system name cache;
    a CNAM (Calling Name) database;
    a Line Information Database (LIDB);
    and providing at least a portion of the obtained information to the user in association with information regarding the facsimile.

47. The method as defined in claim 33, the method further comprising:
    determining if the user has an existing contact record for the caller; and
    if the user does not have an existing contact record for the caller, creating a call record for the caller using at least a caller phone address provided by the carrier system.

48. The method as defined in claim 33, the method further comprising using a caller phone address provided by the carrier system to determine if the user has indicated whether facsimiles from the caller are not to be delivered to the user.

49. The method as defined in claim 33, the method further comprising the call processing system determining that the call is a facsimile related call by comparing the user phone address with information stored in at least one database.

50. The method as defined in claim 33, wherein the second message is an AIN-based message.

51. The method as defined in claim 33, the method further comprising causing, at least in part, call frequency information associated with the caller to be updated.

52. The method as defined in claim 33, wherein the facsimile is streamed from the call processing system to a user terminal, wherein at least a portion of the facsimile is received at the terminal before the call processing system receives all of the facsimile.

53. The method as defined in claim 33, wherein at least a portion of the call log is displayed to the user via a widget and/or gadget.

54. The method as defined in claim 33, wherein the identifier associated with the user is the user phone address and/or an account number.

55. A method of processing facsimiles, wherein a first telecommunications system monitors a condition for a user phone address, the method comprising:

receiving at a second telecommunication system an indication from the first telecommunication system that the condition has been satisfied, wherein the condition is at least partly satisfied by a first call directed to the user phone address being received at the first telecommunications system;

receiving at the second telecommunication system the caller phone address and information related to the user;

connecting to the first call at the second telecommunications system;

determining if the first call is a facsimile call;

if the first call is a facsimile call, receiving a facsimile via the call at the second telecommunication system; and providing over a network information regarding the facsimile call, wherein some or all of the information is displayed in a call log visually accessible by the user.

56. The method as defined in claim 55, wherein a termination attempt trigger set on the user phone address is used to determine that the condition has been satisfied.

57. The method as defined in claim 55, wherein a Wireless Intelligent Network (WIN) set on the user phone address is used to determine that the condition has been satisfied.

58. The method as defined in claim 55, wherein the second telecommunication system determines the first call is a facsimile call at least in part by detecting a fax tone.

59. The method as defined in claim 55, wherein if the first call is not a facsimile call, the first telecommunication system directs the first call to a phone associated with the user.

60. The method as defined in claim 55, wherein the call log is visually accessible by the user in the form of a widget and/or gadget.

* * * * *